(12) United States Patent
Konno

(10) Patent No.: US 8,867,085 B2
(45) Date of Patent: Oct. 21, 2014

(54) PRINTING DEVICE AND METHOD FOR CONTROLLING SYNCHRONIZING OF AN OUTPUT OF EACH COLOR IMAGE DATA FROM A PLURALITY OF BUFFER MEMORIES

(75) Inventor: Satoko Konno, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 315 days.

(21) Appl. No.: 13/232,434

(22) Filed: Sep. 14, 2011

(65) Prior Publication Data

US 2012/0069402 A1 Mar. 22, 2012

(30) Foreign Application Priority Data

Sep. 16, 2010 (JP) .................. 2010-208608
Aug. 4, 2011 (JP) .................. 2011-171383

(51) Int. Cl.
*G06K 15/00* (2006.01)
*G06K 15/02* (2006.01)

(52) U.S. Cl.
CPC .................. *G06K 15/1896* (2013.01)
USPC ........................ 358/1.16; 358/1.17

(58) Field of Classification Search
USPC ............................ 358/1.16, 1.17
See application file for complete search history.

(56) References Cited

U.S. PATENT DOCUMENTS

| 5,471,322 | A | * | 11/1995 | Murata | 358/502 |
| 5,825,994 | A | * | 10/1998 | Kumada | 358/1.17 |
| 8,134,737 | B2 | * | 3/2012 | Sai et al. | 358/1.16 |
| 2004/0255188 | A1 | * | 12/2004 | Lo | 714/12 |
| 2005/0062994 | A1 | * | 3/2005 | Shiraishi | 358/1.9 |
| 2006/0132822 | A1 | * | 6/2006 | Walmsley | 358/1.14 |

FOREIGN PATENT DOCUMENTS

| JP | 2002-254736 | 9/2002 |
| JP | 2002-254763 | 9/2002 |
| JP | 2004-287519 | 10/2004 |

OTHER PUBLICATIONS

U.S. Appl. No. 13/232,510, filed Sep. 14, 2011, Konno.

* cited by examiner

*Primary Examiner* — Benjamin O Dulaney
(74) *Attorney, Agent, or Firm* — Oblon, Spivak, McClelland, Maier & Neustadt, L.L.P.

(57) ABSTRACT

A printing device includes a plurality of storage units into which image data is written, a control unit which has storage space information indicating a same storage space as a storage space of each of the plurality of storage units and manages address information to perform a writing and reading of image data with respect to the plurality of storage units on the basis of the storage space information, a plurality of data managing units which are provided correspondingly to the plurality of storage units and perform the writing and the reading of the image data with respect to the plurality of storage units on the basis of the address information, and a printing unit which prints the image data read from the plurality of storage units on a same page.

10 Claims, 31 Drawing Sheets

(TO IMAGE OUTPUT UNIT)

FIG.7

| No | CLASSIFICATION | NAME | DIRECTION (DFE ⇔ PCTL) | CONTENTS |
|---|---|---|---|---|
| 1 | JOB INFORMATION | JOB START | ⇔ | NOTIFICATION OF JOB START / RESPONSE JOB IDENTIFIER (JOBID) COMMUNICATION |
| 2 | | JOB END | ⇔ | NOTIFICATION OF END OF ALL OF PRINTING PROCESSES REQUESTED BY CORRESPONDING JOB / RESPONSE JOB IDENTIFIER (JOBID) COMMUNICATION |
| 3 | | PRINTING PROCESS RECEPTION START | ↓ | NOTIFY THAT PRINTER CAN RECEIVE PRINTING PROCESS |
| 4 | | PRINTER INFORMATION REQUEST/ NOTIFICATION | ⇔ | NEEDED PRINTER INFORMATION REQUEST / NOTIFICATION |
| 5 | | PRINTING PROCESS START | ⇔ | NOTIFY THAT IMAGE DATA IS PREPARED / RESPONSE OUTPUT ORDER, PAGE (PROCESS) UNIT |
| 6 | PRINTER STATE/ PRINTING PROCESS | PRINTING PROCESS REQUEST | ⇔ | REQUEST PRINTING PROCESS BY PRINTER CONTROLLER / RESPONSE COLOR, PROCESS IDENTIFICATION NUMBER, PLANE IDENTIFICATION NUMBER PLANE UNIT, REQUEST IN REQUEST ORDER OF ENGINE ※BITMAP IS TAKEN FROM ENGINE |
| 7 | | DATA TRANSFER COMPLETION | ↑ | NOTIFY TRANSFER COMPLETION OF REQUESTED PLANE |
| 8 | | DATA RECEPTION COMPLETION | ↓ | NOTIFY RECEPTION COMPLETION OF REQUESTED PLANE |
| 9 | | PRINTING PROCESS COMPLETION | ↑ | COMPLETE PRINTING REQUEST FOR ALL PAGES (PROCESSES) |
| 10 | | PROCESS STATE REPORT | ↓ | NOTIFY PRINTING STATE OF PROCESS ・FEEDING ・DISCHARGING ・PRINTING START |
| 11 | | SC NOTIFICATION ERROR GENERATION/RELEASE | ⇔ ↑ | ACQUIRE/NOTIFY OBSTACLE INFORMATION OF PRINTER NOTIFY OBSTACLE GENERATION/RELEASE OF UPPER LEVEL DEVICE |
| 12 | PRINTING CONDITIONS | PRINTING CONDITION SETTING | ⇔ | PRINTING CONDITION NOTIFICATION/RESPONSE ・PRINTING FORM (BOTH-SIDED PRINTING/SINGLE-SIDED PRINTING) ・PRINTING TYPE (DATA EXISTS/BLANK PAGE) ・FEEDING/DISCHARGING INFORMATION (FEEDING ORIGIN, DISCHARGING DESTINATION) ・PRINTING SURFACE ORDER (SURFACE → BACK SURFACE/ BACK SURFACE → SURFACE) ・PRINTING PAPER SIZE ・PRINT DATA SIZE ・RESOLUTION, GRADATION ・COLOR INFORMATION ETC. |
| 13 | CONNECTION | REGISTRATION/RELEASE | ⇔ | MUTUAL REGISTRATION OF UPPER LEVEL DEVICE AND PRINTER CONTROLLER |

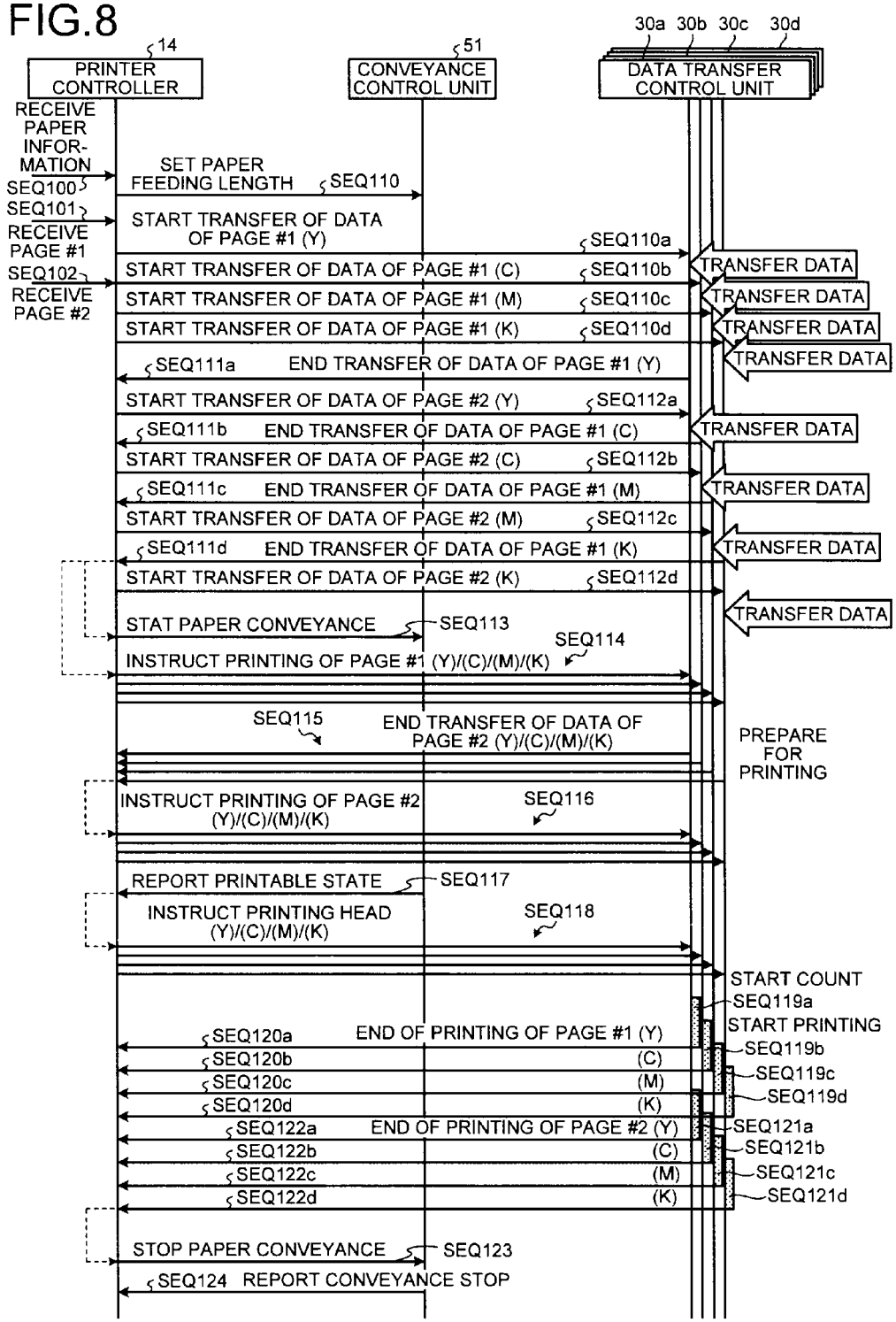

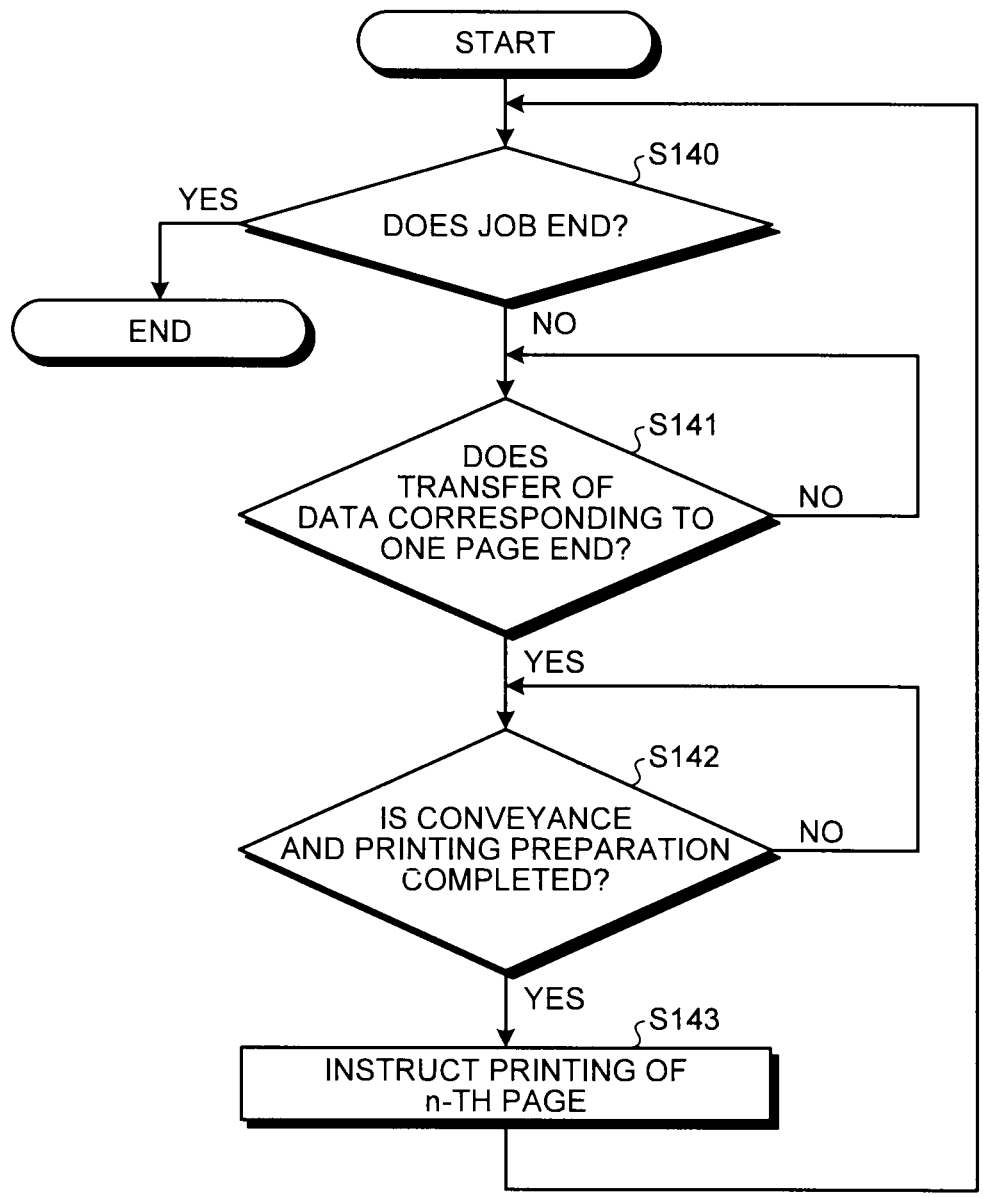

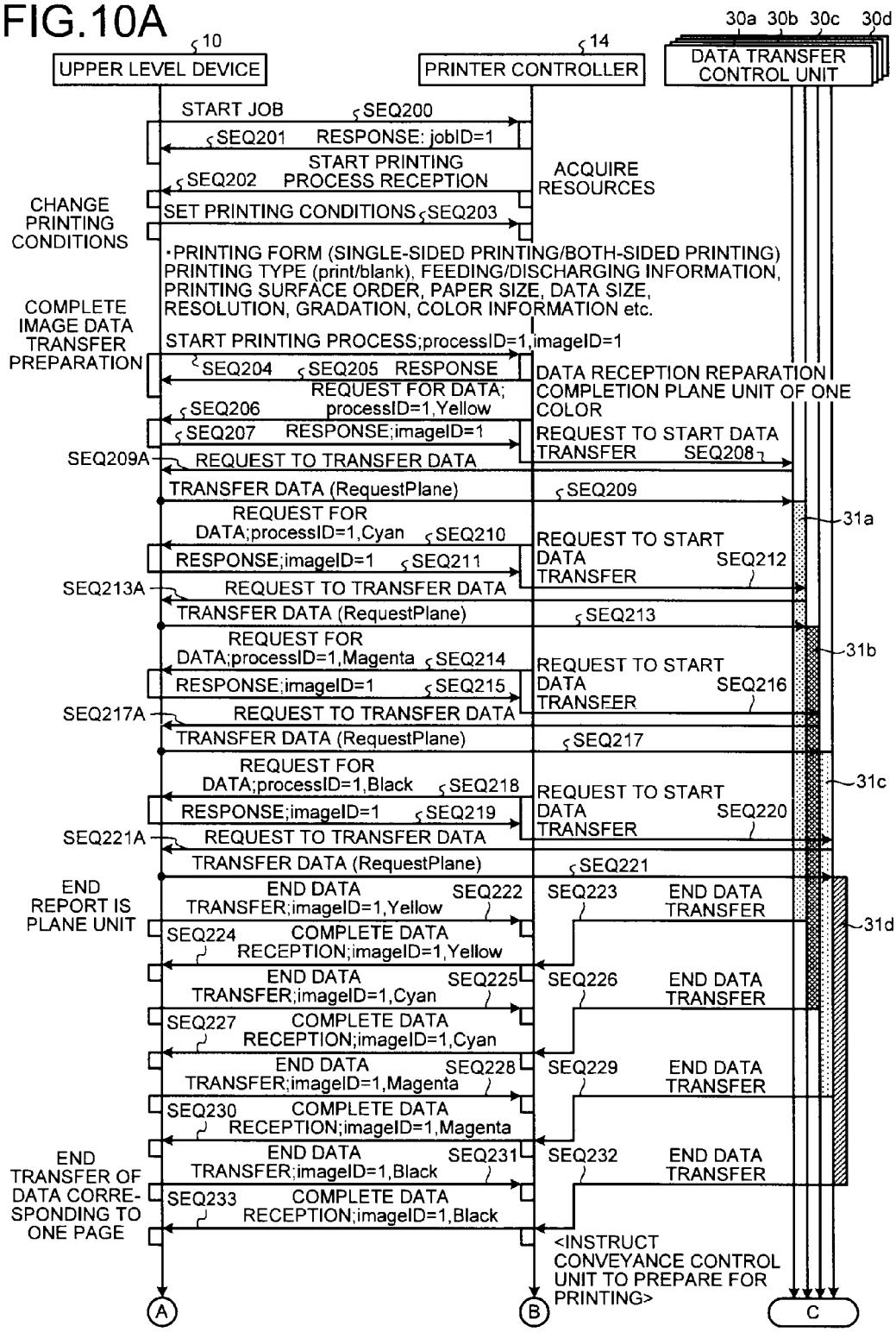

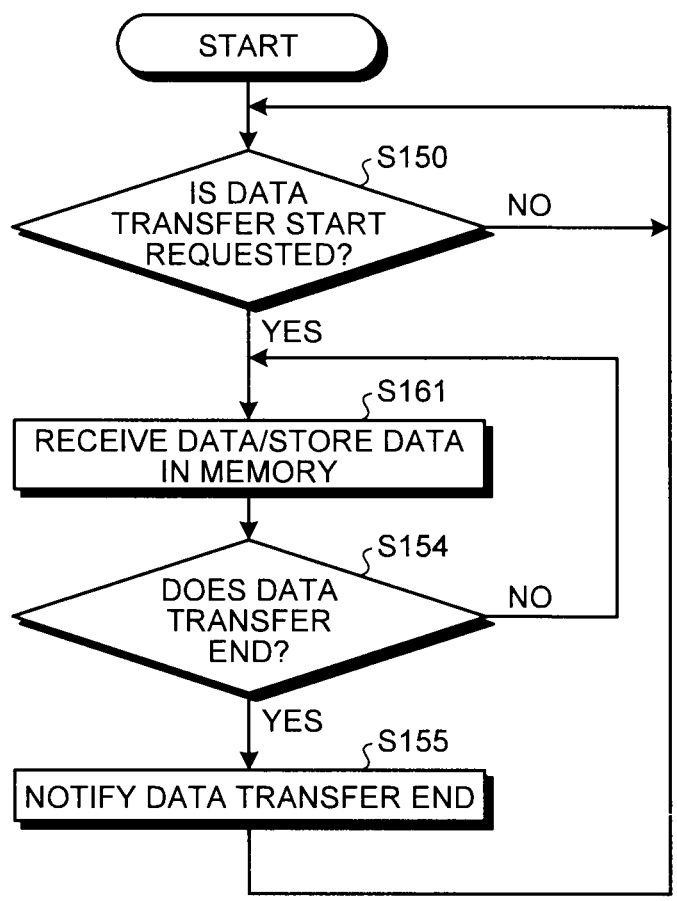

FIG.15

| COLOR | CONTENTS | | | SETTING CONTENTS |
|---|---|---|---|---|
| COM-MON | PBID | | | PAGE IDENTIFIER |
| | DATA AMOUNT FOR EACH PAGE | | | NUMBER OF COLORS (MONOCHROME: 1, FULL COLOR: 4) |
| | FOR DATA TRANSFER | | | |
| | | DATA TRANSFER ORIGIN ADDRESS | | |
| | | DATA STORAGE DESTINATION ADDRESS | | |
| | | DATA TRANSFER SIZE | | BYTE SIZE INCLUDING BOUNDARY ADJUSTMENT SIZE (X*Y) |
| | FOR PRINTING | | | |
| | | RESOLUTION | | MAIN SCANNING: PRINTING RESOLUTION |
| | | | | SUB-SCANNING: PRINTING RESOLUTION |
| | | GRADATION | | NUMBER OF BITS FOR EACH PIXEL |
| | | PAPER FEEDING LENGTH | | NUMBER OF DOTS OF PAPER FEEDING DIRECTION |
| | | PAPER WIDTH | | NUMBER OF DOTS OF PAPER WIDTH DIRECTION |
| | | PRINTING SURFACE (SURFACE/BACK SURFACE) | | PRINTING SURFACE |
| | | UPPER SIDE ON PRINTING PROHIBITED AREA | | PRINTING PROHIBITED AREA OF UPPER SIDE OF PAPER |
| | | LOWER SIDE ON PRINTING PROHIBITED AREA | | PRINTING PROHIBITED AREA OF LOWER SIDE OF PAPER |
| | | LEFT SIDE ON PRINTING PROHIBITED AREA | | PRINTING PROHIBITED AREA OF LEFT SIDE OF PAPER |
| | | RIGHT SIDE ON PRINTING PROHIBITED AREA | | PRINTING PROHIBITED AREA OF RIGHT SIDE OF PAPER |
| | | IMAGE INFORMATION | | |
| | | | BITMAP PRINTING POSITION X | ADDRESS BASED ON UPPER LEFT OF PAPER |
| | | | BITMAP PRINTING POSITION Y | ADDRESS BASED ON UPPER LEFT OF PAPER |
| | | | X DIRECTION EFFECTIVE SIZE | EFFECTIVE SIZE THAT DOES NOT INCLUDE BOUNDARY ADJUSTMENT |
| | | | Y DIRECTION EFFECTIVE SIZE | |
| C | Color IDENTIFIER | | | CYAN |
| | FOR DATA TRANSFER | | | |
| | | DATA TRANSFER NECESSITY/NON-NECESSITY | | SET DATA TRANSFER OF ALL COLORS TO "NON-NECESSITY" IN CASE OF WHITE PAGE |
| | | | | SET DATA TRANSFER TO "NON-NECESSITY" IN COLORS OTHER THAN COLORS INSTRUCTED BY color |
| | FOR PRINTING | | | |
| | | PRINTING NECESSITY/ NON-NECESSITY | | SET PRINTING OF ALL COLORS TO "NON-NECESSITY" IN CASE OF WHITE PAGE |
| | | | | SET PRINTING TO "NON-NECESSITY" IN COLORS OTHER THAN COLORS INSTRUCTED BY color |
| M | EQUAL TO C (HOWEVER, COLOR IDENTIFIER IS MAGENTA) | | | |
| Y | EQUAL TO C (HOWEVER, COLOR IDENTIFIER IS YELLOW) | | | |
| K | EQUAL TO C (HOWEVER, COLOR IDENTIFIER IS BLACK) | | | |

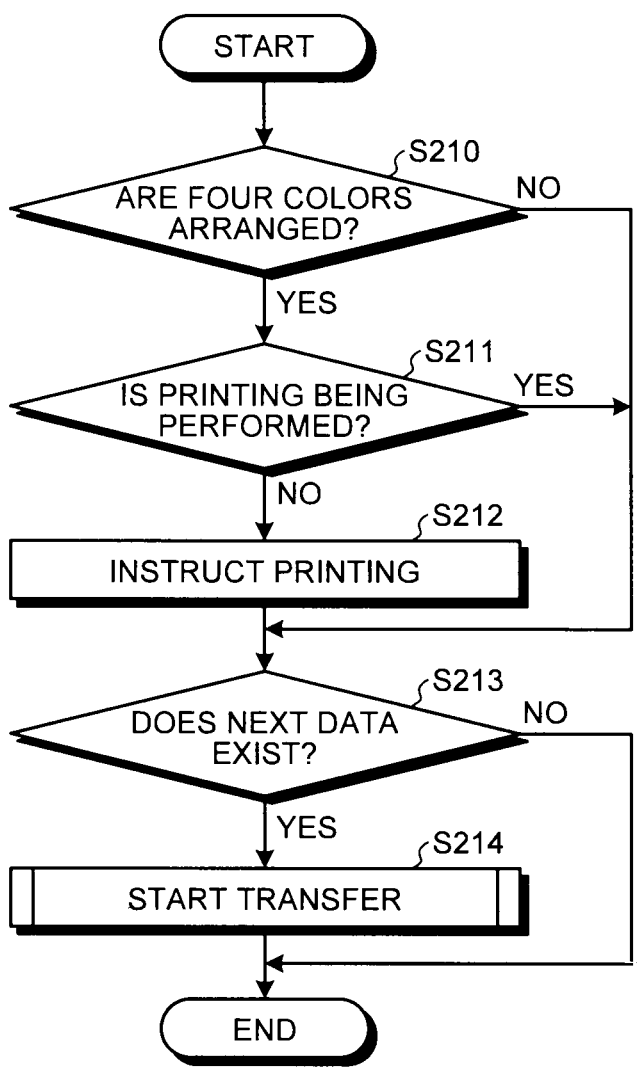

FIG.23

| COLOR | CONTENTS | | | SETTING CONTENTS |
|---|---|---|---|---|
| COMMON | PBID | | | PAGE IDENTIFIER |
| | DATA AMOUNT FOR EACH PAGE | | | NUMBER OF COLORS (MONOCHROME: 1, FULL COLOR: 4) |
| | FOR PRINTING | | | |
| | | RESOLUTION | | MAIN SCANNING: PRINTING RESOLUTION |
| | | | | SUB-SCANNING: PRINTING RESOLUTION |
| | | GRADATION | | NUMBER OF BITS FOR EACH PIXEL |
| | | PAPER FEEDING LENGTH | | NUMBER OF DOTS OF PAPER FEEDING DIRECTION |
| | | PAPER WIDTH | | NUMBER OF DOTS OF PAPER WIDTH DIRECTION |
| | | PRINTING SURFACE (SURFACE/BACK SURFACE) | | PRINTING SURFACE |
| C | Color IDENTIFIER | | | CYAN |
| | FOR DATA TRANSFER | | | |
| | | DATA TRANSFER NECESSITY/NON-NECESSITY | | SET DATA TRANSFER OF ALL COLORS TO "NON-NECESSITY" IN CASE OF WHITE PAGE |
| | | | | SET DATA TRANSFER TO "NON-NECESSITY" IN COLORS OTHER THAN COLORS INSTRUCTED BY color |
| | | TRANSFER COMPLETION FLAG | | ON BY TRANSFER COMPLETION RECEPTION |
| | | DATA TRANSFER ORIGIN ADDRESS | | |
| | | DATA STORAGE DESTINATION ADDRESS | | |
| | | DATA TRANSFER SIZE | | BYTE SIZE INCLUDING BOUNDARY ADJUSTMENT SIZE |
| | FOR PRINTING | | | |
| | | PRINTING NECESSITY/ NON-NECESSITY | | SET PRINTING OF ALL COLORS TO "NON-NECESSITY" IN CASE OF WHITE PAGE |
| | | | | SET PRINTING TO "NON-NECESSITY" IN COLORS OTHER THAN COLORS INSTRUCTED BY color |
| | | UPPER SIDE ON PRINTING PROHIBITED AREA | | PRINTING PROHIBITED AREA OF UPPER SIDE OF PAPER |
| | | LOWER SIDE ON PRINTING PROHIBITED AREA | | PRINTING PROHIBITED AREA OF LOWER SIDE OF PAPER |
| | | LEFT SIDE ON PRINTING PROHIBITED AREA | | PRINTING PROHIBITED AREA OF LEFT SIDE OF PAPER |
| | | RIGHT SIDE ON PRINTING PROHIBITED AREA | | PRINTING PROHIBITED AREA OF RIGHT SIDE OF PAPER |
| | | IMAGE INFORMATION | | |
| | | | BITMAP PRINTING POSITION X | ADDRESS BASED ON UPPER LEFT OF PAPER |
| | | | BITMAP PRINTING POSITION Y | ADDRESS BASED ON UPPER LEFT OF PAPER |
| | | | X DIRECTION EFFECTIVE SIZE | EFFECTIVE SIZE THAT DOES NOT INCLUDE BOUNDARY ADJUSTMENT |
| | | | Y DIRECTION EFFECTIVE SIZE | |
| M | EQUAL TO C (HOWEVER, COLOR IDENTIFIER IS MAGENTA) | | | |
| Y | EQUAL TO C (HOWEVER, COLOR IDENTIFIER IS YELLOW) | | | |
| K | EQUAL TO C (HOWEVER, COLOR IDENTIFIER IS BLACK) | | | |

PRINTING DEVICE AND METHOD FOR CONTROLLING SYNCHRONIZING OF AN OUTPUT OF EACH COLOR IMAGE DATA FROM A PLURALITY OF BUFFER MEMORIES

CROSS-REFERENCE TO RELATED APPLICATIONS

The present application claims priority to and incorporates by reference the entire contents of Japanese Patent Application No. 2010-208608 filed in Japan on Sep. 16, 2010 and Japanese Patent Application No. 2011-171383 filed in Japan on Aug. 4, 2011.

BACKGROUND OF THE INVENTION

1. Field of the Invention

The present invention relates to a printing device that performs printing according to print image data transmitted from an upper level device and a method of controlling a printing device.

2. Description of the Related Art

In the related art, a printing system has been known which includes a printing device and an upper level device delivering print data to the printing device as well as instructing the printing device to perform printing. In this printing system, for example, the upper-level device generates a raster image type of print image data by using a raster image processer (RIP), on the basis of print data written in PDL (Page Description Language) that is transmitted from a host device, and transmits the generated print image data to a printing control unit of the printing device (for example, refer to Japanese Patent Application Laid-open No. 2004-287519).

Different from the printing system described above, a printing device provided with a printer controller, a printer engine, and data lines to connect the printer controller to the printer engine is already known (for example, refer to Japanese Patent Application Laid-open No. 2002-254763). In the printing device that is disclosed in Japanese Patent Application Laid-open No. 2002-254763, a control line through which various control information is exchanged between the printer controller and the printer engine is separate from the data lines through which print image data is exchanged, so that a high-speed transmission of data can be realized. In the printing system, the print image data of each color is transmitted in parallel so that the high-speed transmission of data in color printing can be realized.

Furthermore, there is proposed a printing system provided with an upper level device for generating print image data, a printing device for performing a print based on the print image data, and a control line and a data line for connecting the aforementioned units, in which the control line and the data line are separate from each other. In this printing system, a printing controller controls also a data processing controller for controlling a transfer timing of the print image data, as well as a control including a sheet conveyance control for conveying a sheet to be printed.

In the printing system according to the related art, in which the control line and the data line are separated, requires an installation of one buffer memory for storing the print image data for each color on the printer engine, in order to perform a color printing with data lines for each color. On the other hand, in the color printing, a plurality of colors are visually mixed to print an almost full-colored image by performing a plurality of printing for each color on one sheet with adjusting positions for each color printing.

For this purpose, the printer controller is required to control the buffer memory for synchronizing each color data through the control line. Thereby, the control system of the buffer memory may be complicated. Therefore, there is a need to provide a controlling method of buffer memory capable of easily synchronizing each color image data stored in the buffer memory.

SUMMARY OF THE INVENTION

It is an object of the present invention to at least partially solve the problems in the conventional technology.

According to an aspect of the present invention, there is provided a printing device including a plurality of storage units into which image data is written, a control unit which has storage space information indicating a same storage space as a storage space of each of the plurality of storage units and manages address information to perform a writing and reading of image data with respect to the plurality of storage units on the basis of the storage space information, a plurality of data managing units which are provided correspondingly to the plurality of storage units and perform the writing and the reading of the image data with respect to the plurality of storage units on the basis of the address information, and a printing unit which prints the image data read from the plurality of storage units on a same page.

According to an aspect of the present invention, there is provided a method of controlling a printing device including, by a control unit, managing address information to perform a writing and a reading of image data with respect to a plurality of storage units on the basis of storage space information indicating a same storage space as a storage space of each of the plurality of storage units into which the image data is written, by a plurality of data managing units provided correspondingly to the plurality of storage units, performing the writing and the reading of the image data with respect to the plurality of storage units on the basis of the address information, and by a printing unit, printing the image data read from each of the plurality of storage units on a same page.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic diagram illustrating an example of control information that is transmitted and received between the upper level device and the printer controller of the printer device;

FIG. 8 is a sequence diagram conceptually illustrating an example of a printing process that can be applied to each embodiment of the present invention;

FIG. 9C is a flowchart illustrating an example of a process of a printing instruction of the printer controller that can be applied to each embodiment of the present invention;

FIG. 10A is a sequence diagram specifically illustrating an example of a printing process that can be applied to each embodiment of the present invention;

FIG. 11B is a flowchart illustrating another example of a process of a data transfer control unit that can be applied to each embodiment of the present invention;

FIG. 15 is a schematic diagram illustrating an example of a transfer management table that is applied to the first embodiment of the present invention;

FIG. 20 is a flowchart illustrating an example of a process when transmission ends;

FIG. 23 is a schematic diagram illustrating an example of the configuration of a transfer management table according to a second embodiment;

DETAILED DESCRIPTION OF THE PREFERRED EMBODIMENTS

Hereinafter, embodiments of a printing system according to the present invention will be described in detail with reference to the accompanying drawings. First, in order to help with understanding, production printing to which a printing system according to each embodiment is applied will be schematically described. In general, the production printing is used when a large capacity of printing is performed in a short time. For this reason, in the production printing, there is constructed a work flow system for controlling from a print data generation to a print distribution, in order to efficiently perform a job control or a print data control, as well as improving the print speed.

The print system according to each embodiment involves a part for implementing the print operation in the work flow for the production printing. In the system, a process using the RIP (hereinafter may be called "RIP process") is performed by a device different from a device for printing the bitmap data obtained through the RIP process. Since the RIP process requires the most long processing time in the printing process, it is possible to improve the print speed by performing the RIP process and the printing process by different devices.

<Outline of Printing System Applicable to Each Embodiment>

Figure 1:
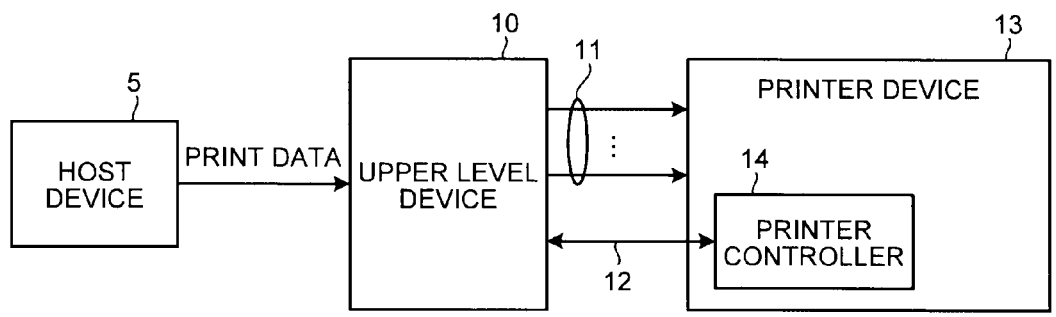
FIG. 1 is a block diagram illustrating an example of the configuration of a printing system that can be applied to each embodiment of the present invention.

FIG. 1 illustrates an example of the configuration of a printing system that can be applied to each embodiment of the present invention. The printing system is provided with an upper level device 10, a printer device 13 as an image forming device, a plurality of data lines 11, and a control line 12. The upper level device 10 is connected with the printer device 13 via the plurality of data lines 11 and the control line 12. A host device 5 may be a computer for example to generate print job data including print image data and print set information.

The print job data may include data written in PDL (hereinafter referred to as "PDL data") for example. The print set information relating to the print setting including print page information, layout information, print run information, as well as the print image data composed of the bitmap image for printing, is generated by interpreting the PDL data.

The upper level device 10 performs the RIP process in accordance with the print job data supplied from the host device 5 to generate the each color bitmap data as print image data. Along with that, the upper level device 10 generates control information for controlling the print operation, on the basis of the print job data and the information from the host device 5.

The print image data for each color generated by the upper level device 10 is supplied to a printer engine unit (not shown) of the printer device 13 through the plurality of data lines 11. Between the upper level device 10 and the printer controller 14, the control information for controlling the print operation is transmitted/received through the control line 12. The print controller 14 controls the printer engine unit on the basis of the transmitted/received control information to form an image on a print medium, thereby perform the print operation according to the print job. Incidentally, the specific example of the control information will be described later with reference to FIGS. 10A to 10C.

The printing method is not limited in particular. However, in each embodiment, printing paper is used as the printing medium and a printing image is formed on the printing paper using an inkjet system. However, the present invention is not limited thereto and each embodiment can be applied to the printing device that forms a printing image on the printing paper using toner. As the printing paper, continuous paper (continuous stationery) where perforations to be cut are provided at a predetermined interval is used. In the production printing, the continuous paper is mainly used as the printing paper. However, the present invention is not limited thereto and cut paper where a size is fixed to an A4 size or a B4 size may be used as the printing paper. In the continuous paper, a page means a region that is interposed by perforations provided at a predetermined interval.

The printing medium that is printed by a printing system according to each embodiment is not limited to printing paper such as paper. That is, other printing media that can be printed by a printing system applied to each embodiment and can be provided as a roll may be used. For example, a plastic film or cloth may be used as the printing medium.

<Upper Level Device>

Figure 2A:
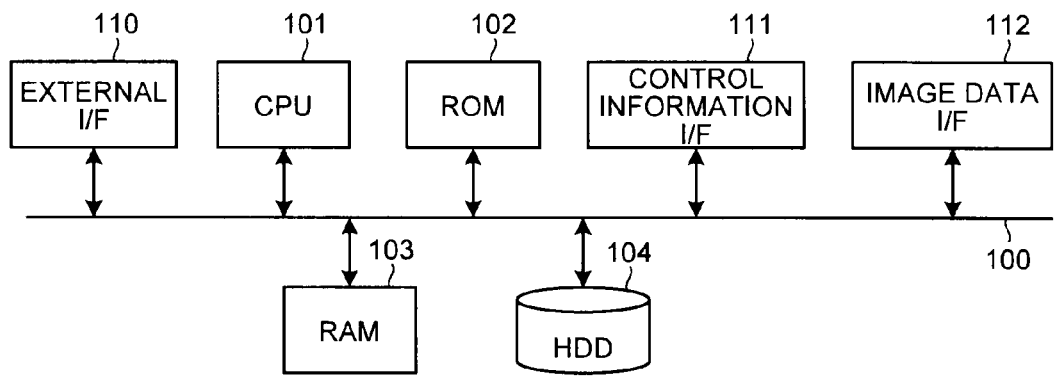
FIG. 2A is a block diagram illustrating an example of the configuration of an upper level device.

FIG. 2A illustrates an example of the configuration of the upper level device 10. A control processing unit (CPU) 101, a read only memory (ROM) 102, a random access memory (RAM) 103, and a hard disk drive (HDD) 104 are connected to a bus 100. An external I/F 110, a control information I/F 111, and a print image data I/F 112 are connected to the bus 100. The individual units that are connected to the bus 100 can communicate with each other through the bus 100.

In the ROM 102 and the HDD 104, a program to operate the CPU 101 is stored in advance. The RAM 103 is used as a work memory of the CPU 101. That is, the CPU 101 uses the RAM 103 as the work memory according to the program stored in the ROM 102 and the HDD 104 and controls all the operations of the upper level device 10.

The external I/F 110 corresponds to, for example, a transmission control protocol/Internet Protocol (TCP/IP) and controls communication with the host device 5. The control information I/F 111 controls communication of control information. Since the print image data I/F 112 controls communication of print image data, the print image data I/F 112 has plural channels. For example, print image data of each color such as yellow (Y), cyan (C), and magenta (M), and black (K) that is generated in the upper level device 10 is output from the plural channels. Since a high-speed transmission speed is required in the print image data I/F 112, the peripheral component interconnect bus express (PCI Express) may be employed. A type of the control information I/F 111 is not limited in particular. However, in this case, similar to the print image data I/F 112, the PCI Express is used.

In this configuration, print job data that is transmitted from the host device 5 is received in the external I/F 110 of the upper level device 10 and is stored in the HDD 104 through the CPU 101. The CPU 101 executes the RIP process on the basis of the print job data read from the HDD 104, generates bitmap data of each color, and writes the bitmap data in the RAM 103. For example, the CPU 101 renders page description language (PDL) data by the RIP process, generates bitmap data of each color, and writes the bitmap data in the RAM 103. The CPU 101 compresses and encodes the bitmap data of each color that is written in the RAM 103 and temporarily stores the bitmap data in the HDD 104.

For example, when a print operation starts in the printer device 13, the CPU 101 reads the compressed and encoded bitmap data of each color from the HDD 104, decodes the compressed code, and writes the extended bitmap data of each color in the RAM 103. The CPU 101 reads the bitmap data of each color from the RAM 103, outputs the bitmap data as the print image data of each color from each channel of the print image data I/F 112, and supplies the bitmap data to the printer device 13. The CPU 101 transmits/receives control information to control printing through the control information I/F 111 between the CPU 101 and the printer device 13, according to a progress situation of the print operation.

Figure 2B:
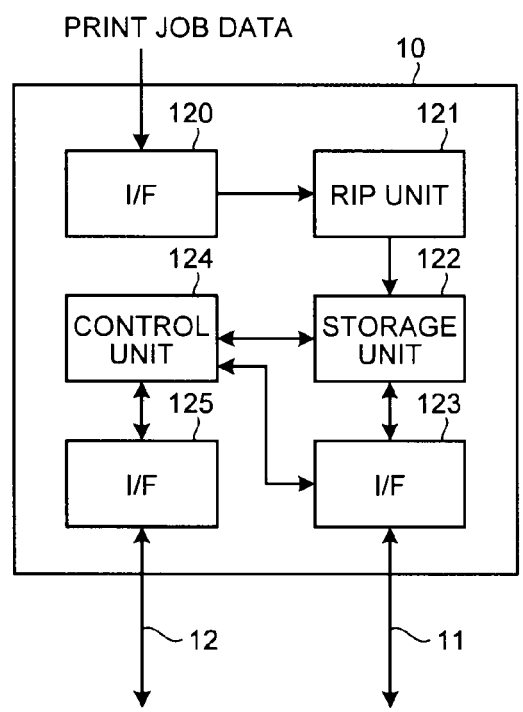
FIG. 2B is a functional block diagram illustrating an example of a function of the upper level device.

FIG. 2B is a functional block diagram illustrating an example of a function of the upper level device 10. The upper level device 10 includes interfaces (I/F) 120, 123, and 125, an RIP unit 121, a storage unit 122, and a control unit 124. The interfaces 120, 123, and 125 correspond to the external I/F 110, the print image data I/F 112, and the control information I/F 111, respectively. The RIP unit 121 and the control unit 124 are configured by a program operating on the CPU 101 in FIG. 2A. The storage unit 122 corresponds to at least one of the RAM 103 or the HDD 104 in FIG. 2A.

The print job data that includes the PDL data is generated by the host device 5 and is transmitted to the upper level device 10. The print job data is received in the interface 120 and is supplied to the RIP unit 121. The RIP unit 121 performs rendering on the basis of the PDL data included in the supplied print job data and generates print image data based on the bitmap data of each color of Y, C, M, and K. The RIP unit 121 sequentially stores the generated print image data of each color of Y, C, M, and K in the storage unit 122.

The control unit 124 communicates with the printer controller 14 of the printer device 13 through the interface 125. For example, the control unit 124 generates control information to control printing in the printer device 13, on the basis of the print job data supplied from the host device 5 through the interface 120. The control information is transmitted from the control unit 124 to the printer controller 14 through the interface 125.

The interface 123 is configured to have independent access to the print image data of each color of Y, C, M, and K stored in the storage unit 122. The interface 123 is connected to the printer device 13 through the plurality of data lines 11 corresponding to the individual colors of Y, C, M, and K, and exchanges control information related to print image data transfer of each color of Y, C, M, and K between the interface 123 and the printer device 13 or transmits print image data of each color of Y, C, M, and K.

<Printer Device>

Figure 3A:
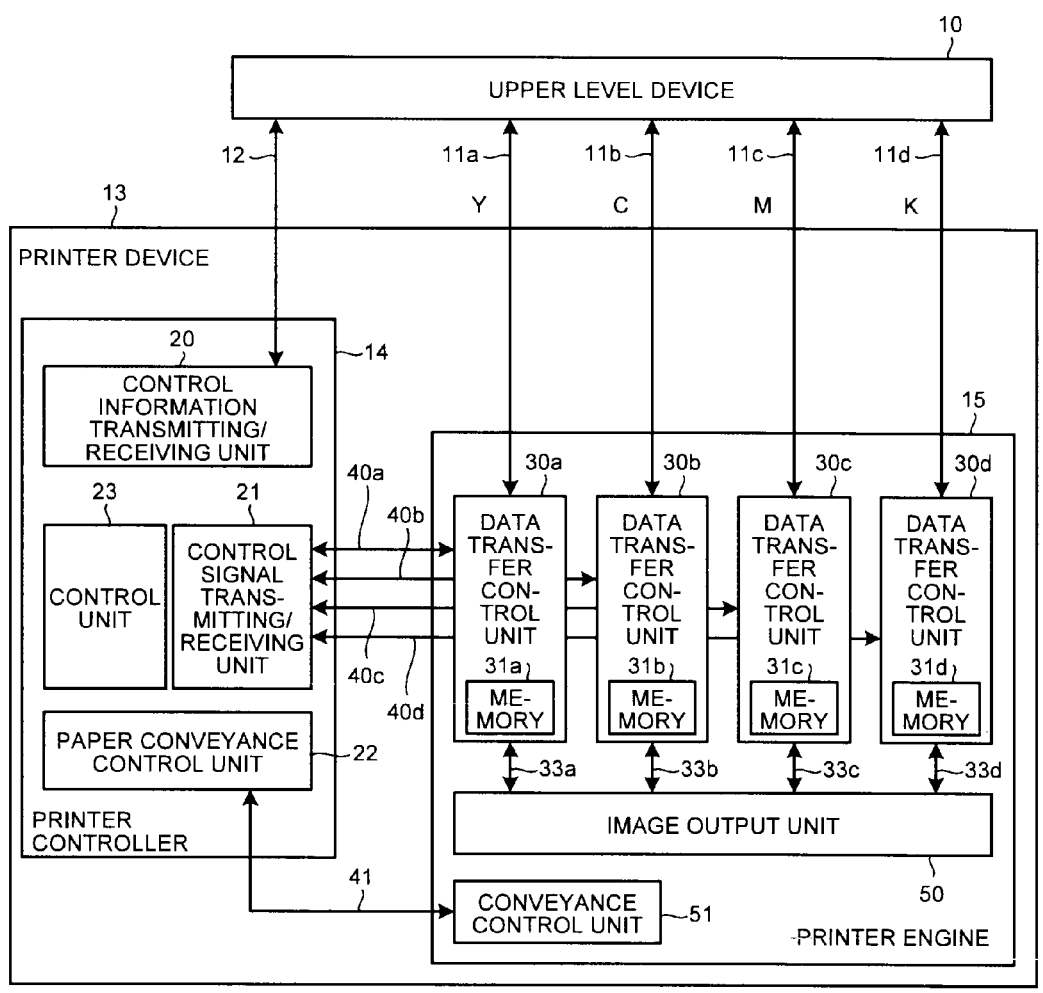
FIG. 3A is a block diagram illustrating an example of the configuration of a printer device.

FIG. 3A illustrates an example of the configuration of the printer device 13. The printer device 13 includes a printer controller 14 and a printer engine 15. The printer controller 14 is connected to the control line 12, and exchanges control information with the upper level device 10 through the control line 12 to control a print operation. The printer engine 15 is connected to the plurality of data lines 11a, 11b, 11c, and 11d and executes a printing process of print image data of each color that is transmitted from the upper level device 10 through the data lines 11a, 11b, 11c, and 11d according to the control of the printer controller 14.

The printer controller 14 and the printer engine 15 will be described in more detail. The printer controller 14 includes a control information transmitting/receiving unit 20, a control signal transmitting/receiving unit 21, a paper conveyance control unit 22, and a control unit 23.

The control information transmitting/receiving unit 20 exchanges control information to control printing with the upper level device 10 through the control line 12. The control signal transmitting/receiving unit 21 is connected to data transfer control units 30a, 30b, 30c, and 30d to be described below through engine I/F control lines 40a, 40b, 40c, and 40d. The control signal transmitting/receiving unit 21 exchanges a control signal individually with the data transfer control units 30a, 30b, 30c, and 30d. The paper conveyance control unit 22 is connected to a conveyance control unit 51 to be described below through a conveyance control line 41 and exchanges a control signal with the conveyance control unit 51 to control paper conveyance.

The control unit 23 includes a CPU, a ROM, and a RAM, and uses the RAM as a work memory to control the individual units of the printer controller 14 according to a program previously stored in the ROM. The control unit 23 analyzes control information that is transmitted from the upper level device 10 and is received by the control information transmitting/receiving unit 20 and delivers the control information to the control signal transmitting/receiving unit 21 or the paper conveyance control unit 22.

The control information transmitting/receiving unit 20, the control signal transmitting/receiving unit 21, and the paper conveyance control unit 22 may be configured as hardware controlled by the control unit 23 and may be configured as a program module that operates on the control unit 23.

Figure 3B:
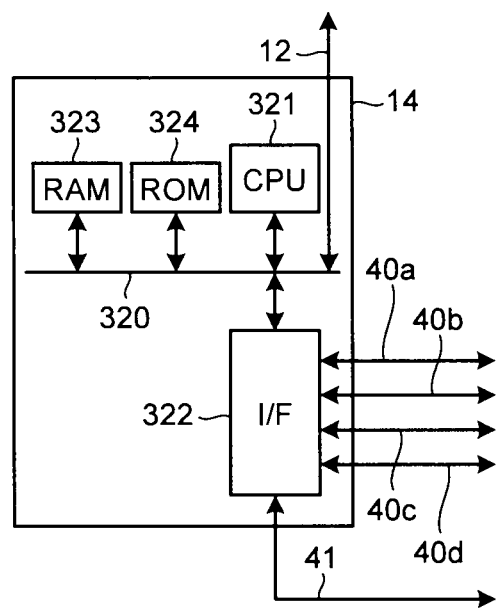
FIG. 3B is a block diagram illustrating an example of the configuration of a printer controller.

FIG. 3B illustrates an example of the hardware configuration of the printer controller 14. The printer controller 14 includes a CPU 321, an interface (I/F) 322, a RAM 323, and a ROM 324. The CPU 321, the interface (I/F) 322, the RAM 323, and the ROM 324 are connected to a bus 320 such that they can communicate with each other. To the bus 320, a control line 12 is also connected through a communication I/F not illustrated in the drawings. The CPU 321 operates using the RAM 323 as the work memory according to the program stored in the ROM 324 and controls all the operations of the printer device 13. The interface 322 includes a logic circuit that is configured in a hardware manner and controls communication with a printer controller 14, data transfer control units 30a, 30b, 30c, and 30d and a conveyance control unit 51.

In this configuration, for example, functions of the control signal transmitting/receiving unit 21 and the paper conveyance control unit 22 illustrated in FIG. 3A are realized by the I/F 322. The function of the control unit 23 is realized by the program operated on the CPU 321. The function of the control information transmitting/receiving unit 20 is realized by a communication I/F not illustrated in the drawings and the bus 320.

Returning to the description of FIG. 3A, the printer engine 15 includes the plurality of data transfer control units 30a, 30b, 30c, and 30d that have the same configuration, an image output unit 50 that outputs an image based on the print image data to paper and forms an image, and a conveyance control unit 51 that controls conveyance of printing paper.

The data lines 11a, 11b, 11c, and 11d are connected to the data transfer control units 30a, 30b, 30c, and 30d, respectively. The data transfer control units 30a, 30b, 30c, and 30d include memories 31a, 31b, 31c, and 31d, respectively, and store the print image data of the individual colors transmitted from the upper level device 10 through the data lines 11a, 11b, 11c, and 11d in the memories 31a, 31b, 31c, and 31d.

Each of the memories 31a, 31b, 31c, and 31d has the same memory capacity and the same address configuration. Each of the memories 31a, 31b, 31c, and 31d preferably has the memory capacity that can store print image data of at least three pages. For example, the three pages of the print image data correspond to print image data of a page during transmission from the upper level device 10, print image data of a page during an output, and print image data of the next page. However, the present invention is not limited thereto and each of the memories 31a, 31b, 31c, and 31d may store print image data of two pages or less.

The data transfer control units 30a, 30b, 30c, and 30d are connected to the control signal transmitting/receiving unit 21 by engine I/F control lines 40a, 40b, 40c, and 40d, respectively. The control signal transmitting/receiving unit 21 can transmit/receive a control signal between the data transfer control units 30a, 30b, 30c, and 30d through the engine I/F control lines 40a, 40b, 40c, and 40d.

Figure 4A:
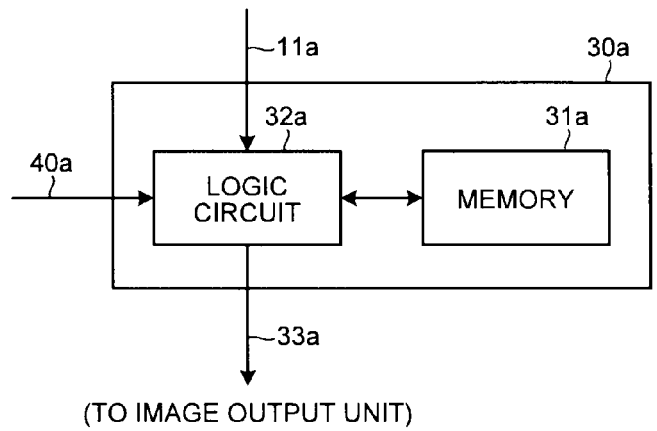
FIG. 4A is a block diagram schematically illustrating an example of the configuration of a data transfer control unit.

FIG. 4A schematically illustrates an example of the configuration of the data transfer control unit 30a. Since the common configuration is applied to the data transfer control units 30a, 30b, 30c, and 30d, the configuration of the data transfer control unit 30a among the data transfer control units 30a, 30b, 30c, and 30d is illustrated representatively in FIG. 4A.

The data transfer control unit 30a includes a memory 31a and a logic circuit 32a. The engine I/F control line 40a and the data line 11a are connected to the logic circuit 32a. The logic circuit 32a stores the print image data transmitted from the upper level device 10 through the data line 11a in the memory 31a, according to the control signal received from the control signal transmitting/receiving unit 21 through the engine I/F control line 40a. Likewise, the logic circuit 32a reads the print image data from the memory 31a according to a control signal received from the control signal transmitting/receiving unit 21 through the engine I/F control line 40a and supplies the print image data to an image output unit 50 to be described through an output line 33a.

The control by the logic circuit 32a that is configured in a hardware manner with a combination of logic circuits is advantageous in that a high-speed process can be executed, over the control by a CPU which uses interrupts to make a program diverge into processes. For example, the logic circuit 32a performs logic determination with respect to a control signal based on a bit string that is received through the engine I/F control line 40a and determines a process to be executed. However, the present invention is not limited thereto and the same function as that of the logic circuit 32a may be realized in a software manner using the CPU.

The print image data of the individual colors that are output from the data transfer control units 30a, 30b, 30c, and 30d is supplied to the image output unit 50. The image output unit 50 executes printing based on the print image data of each color. In each embodiment, printing of the print image data is performed by an inkjet system that ejects ink from nozzles in heads and performs printing. However, the printing system is not limited to the inkjet system and a laser printer system may be used.

Figure 4B:
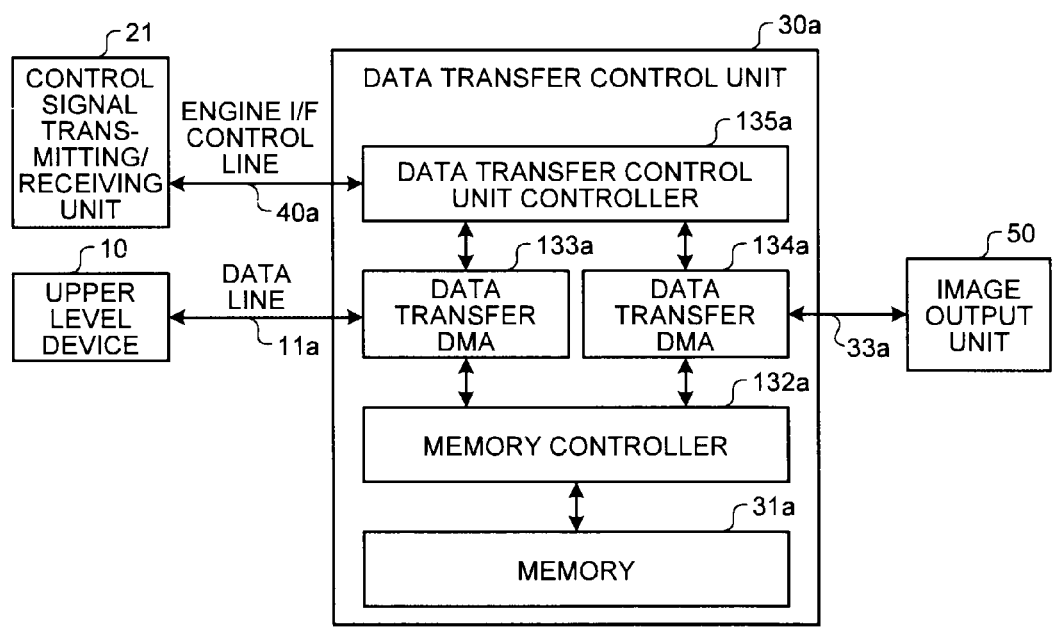
FIG. 4B is a block diagram specifically illustrating an example of the configuration of the data transfer control unit.

FIG. 4B specifically illustrates an example of the configuration of the data transfer control unit 30a. In FIG. 4B, components that are common to those of FIG. 4A are denoted by the same reference numerals and the redundant description will not be repeated. The data transfer control unit 30a includes a memory 31a, a memory controller 132a, data transfer direct memory accesses (DMA) 133a and 134a, and a data transfer control unit controller 135a. Among these components, the memory controller 132a, the data transfer DMAs 133a and 134a, and the data transfer control unit controller 135a are included in the logic circuit 32a illustrated in FIG. 4A.

The memory controller 132a controls access with respect to the memory 31a. The data transfer DMA 133a receives print image data from the upper level device 10 and writes the print image data in the memory through the memory controller 132a. The data transfer DMA 134a reads data from the memory 31a through the memory controller 132a and transmits the data to the image output unit 50 through the output line 33a. The data transfer control unit controller 135a receives control information that is transmitted from the control signal transmitting/receiving unit 21 in the printer controller 14 through the engine I/F control line 40a and controls the data transfer DMAs 133a and 134a according to the received control information.

For example, once a data transfer start request transmitted from the control signal transmitting/receiving unit 21 is received in the data transfer control unit controller 135a through the engine I/F control line 40a, the data transfer control unit controller 135a instructs the data transfer DMA 133a to start to transmit data, according to the data transfer start request. The data transfer DMA 133a transmits the data transfer request to the upper level device 10 through the data line 11a according to the instruction. For example, the data that is transmitted from the upper level device 10 according to the data transfer request is received in the data transfer DMA 133a and is written at a predetermined address of the memory 31a through the memory controller 132a.

Once the printing instruction that is transmitted from the control signal transmitting/receiving unit 21 is received in the data transfer control unit controller 135a through the engine I/F control line 40a, the data transfer control unit controller 135a instructs the data transfer DMA 134a to read data from the memory 31a. The data transfer DMA 134a reads data from the memory 31a through the memory controller 132a, according to the instruction. The data transfer DMA 134a transmits the read data to the image output unit 50 through the output line 33a.

Figure 5:
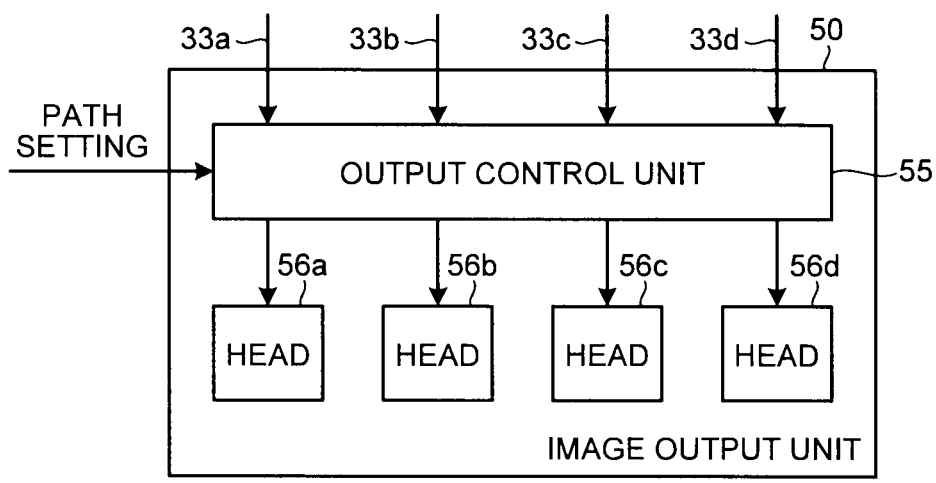
FIG. 5 is a block diagram illustrating an example of the configuration of an image output unit.

FIG. 5 illustrates an example of the configuration of the image output unit 50. The image output unit 50 includes an output control unit 55 and heads 56a, 56b, 56c, and 56d of the individual colors of Y, C, M, and K. A relation between the colors and the heads 56a, 56b, 56c, and 56d is not limited to the above example. The output control unit 55 controls connection of output lines 33a, 33b, 33c, and 33d to which print image data of the data transfer control units 30a, 30b, 30c, and 30d is output and the heads 56a, 56b, 56c, and 56d. That is, the output control unit 55 can set a path such that each of the heads 56a, 56b, 56c, and 56d is connected to any one output line selected from the output lines 33a, 33b, 33c, and 33d.

For example, the output control unit 55 may set the output lines 33a, 33b, 33c, and 33d and the heads 56a, 56b, 56c, and 56d to be connected in a one-to-one relation. Further, the output lines 33a, 33b, 33c, and 33d may be set to be connected to the heads 56a, 56b, 56c, and 56d in a one-to-multiple relation, such that the heads 56a, 56b, 56c, and 56d are connected to the output line 33a.

Paths to connect the output lines 33a, 33b, 33c, and 33d with the heads 56a, 56b, 56c, and 56d may be set by an operation from the user using a DIP switch. However, the present invention is not limited thereto and the paths may be set by a control signal from the control signal transmitting/receiving unit 21.

As described above, in the printer device 13 according to each embodiment, transmission of the print image data from the upper level device 10 and transmission/reception of a control signal to control printing of the print image data between the upper level device 10 and the printer device 13 are performed through different paths. The print image data of the individual colors is transmitted from the upper level device 10 through the different data lines 11a, 11b, 11c, and 11d and the print image data of the individual colors that is transmitted through the data lines 11a, 11b, 11c, and 11d is independently controlled dud is supplied to the data transfer control units 30a, 30b, 30c, and 30d that have the same configuration. Further, in the image output unit 50, connection paths of outputs of the data transfer control units 30a, 30b, 30c, and 30d and the heads 56a, 56b, 56c, and 56d of the individual colors can be set by a user operation or the like.

Therefore, the printer device 13 according to each embodiment can easily change the configuration of the printer engine 15, according to the number of colors of the print image data (four colors of Y, C, M, and K or only color of K) or the number of heads used by the image output unit 50. At this time, the printer engine 15 may be provided with only the necessary units among the data transfer control units 30a, 30b, 30c, and 30d according to the required configuration.

For example, in a case of performing a full-color printing with four colors Y, C, M, and K, all of the data transfer control units 30a, 30b, 30c, and 30d may be provided in the printer engine 15. In the output control unit 55, the outputs of the data transfer control units 30a, 30b, 30c, and 30d may be connected to the heads 56a, 56b, 56c, and 56d, respectively. For example, in a case of performing a mono-color printing with only color K, it may be configured from a cost viewpoint that only the data transfer control unit 30a is provided with only the head 56a. And, in the output control unit 55, the output of the data transfer control unit 30a can be connected to the head 56a. Alternatively, in the case of performing the mono-color printing with the only color K, it may be configured form a speed viewpoint that only the data transfer control unit 30a is provided with four heads 56a, 56b, 56c and 56d. And, in the output control unit 55, the output of the data transfer control unit 30a can be connected to four heads 56a, 56b, 56c and 56d. In this case, the same color is printed overlappingly a plurality of times. Therefore, for example, a high speed printing may be realized by shortening the ejection time of ink from heads 56a, 56b, 65c and 56d respectively to ¼ of the usual ejection time and increasing the conveyance speed of sheet paper to quadruple of the usual conveyance speed.

<Conveyance System of Printing Paper>

Figure 6:
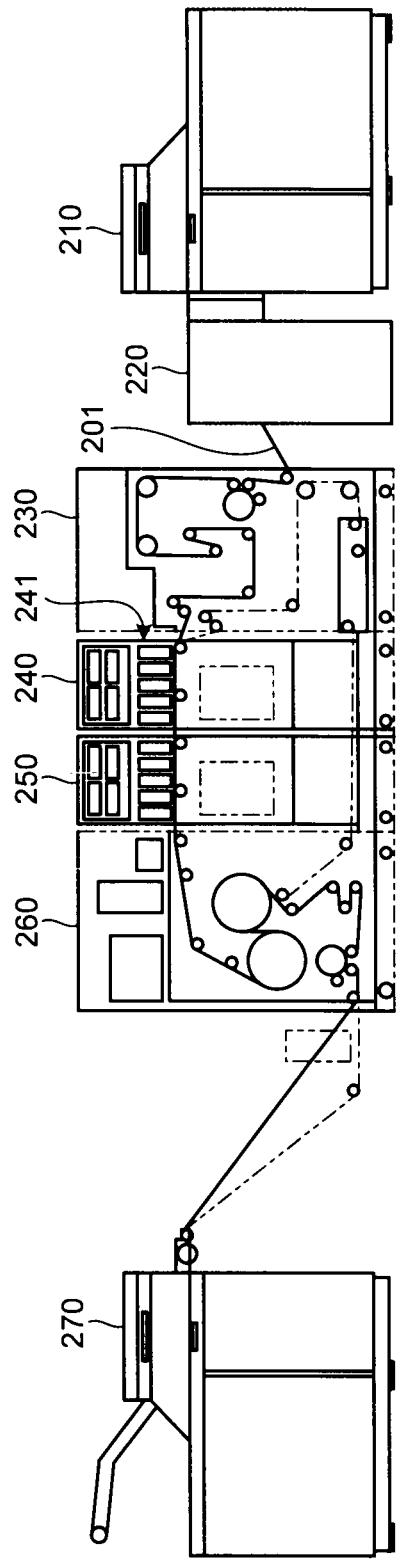
FIG. 6 is a schematic diagram illustrating an example of the configuration of a printer device including a conveyance system of paper that can be applied to each embodiment of the present invention.

Referring to FIG. 3A, the conveyance control unit 51 is connected to the paper conveyance control unit 22 by the conveyance control line 41 and controls conveyance of paper to which an image is formed by the image output unit 50 on the basis of the print image data. FIG. 6 schematically illustrates an example of the configuration of a printer device 200 that includes a conveyance system of paper that can be applied to each embodiment of the present invention. As described above, in each embodiment, the printer device 200 uses continuous paper as printing paper.

Printing paper 201 is fed from a printing paper feeding unit 210 to a first conveyance unit 230 through a power supply operation box 220. In the first conveyance unit 230, the printing paper 201 is conveyed through plural rollers by conveyance control of the conveyance control unit 51, is aligned, and is fed to printer engine units 240 and 250 that correspond to the printer engine 15.

In a printing unit 241 that corresponds to the image output unit 50, the printer engine units 240 and 250 perform printing according to print image data with respect to the printing paper 201 fed from the first conveyance unit 230. The printing paper 201 where the printing ends is discharged from the printer engine unit 250 by the conveyance control of the conveyance control unit 51 and is fed to a second conveyance unit 260. The printed paper 201 is conveyed to a predetermined position by the second conveyance unit 260 to be discharged, and is fed to a cutting unit 270. The printed paper 201 is cut by the cutting unit 270 according to perforations and divided into individual pages.

In this case, the printing paper continuously exists even in a path until the printing paper 201 is discharged from the second conveyance unit 260 after printing is performed on the printing paper 201 in the printer engine units 240 and 250, in order for the printer device 200 to perform printing on the printing paper 201 which is the continuous paper.

The configuration that includes the first conveyance unit 230, the printer engine units 240 and 250, and the second conveyance unit 260 is additionally prepared, the printed paper 201 that is discharged from the second conveyance unit 260 disposed on the front side is reversed and fed to the first conveyance unit 230 disposed on the rear side, and both-sided printing with respect to the printing paper 201 can be performed.

<Detail of Printing Process Applicable to Each Embodiment>

Next, a printing process applicable to each embodiment will be further described in detail. FIG. 7 illustrates an example of control information that is transmitted/received between the upper level device 10 and the printer controller 14 of the printer device 13 through the control line 12. In FIG. 7, the upper level device 10 is illustrated as a digital front end processor (DFE) and the printer controller 14 is illustrated as a PCTL. The control information roughly includes (i) job information, (ii) information indicating a printer status and a printing process, (iii) information indicating a printing condition, and (iv) information indicating a connection.

The job information is used to notify a job start and a job end. The job start includes a notification of the job start with respect to the printer controller 14 from the upper level device 10 and a response from the printer device 13 to the upper level device 10 with respect to the notification. The job end includes a notification of an end of all of the printing processes that are requested by the job start with respect to the printer controller 14 from the upper level device 10 and a response from the printer controller 14 to the upper level device 10 with respect to the notification. At the time of a response in the job start and the job end, a job identifier (JOBID) to identify a job is transmitted from the printer controller 14 to the upper level device 10.

The information indicating a printer status and a printing process includes a printing process reception start notification, a request/notification of printer information, a printing process start notification, a printing process request, a data transfer completion notification, a data reception completion notification, a printing process completion notification, a process status report, a service control (SC) notification, and an error occurrence and removal notification.

As for the printing process reception start notification, the printer device 13 notifies the upper level device 10 that the printer controller 14 is ready to receive a printing process. The request/notification of printer information includes a request of necessary printer information from the upper level device 10 to the printer controller 14, as well as a response to the request from the printer controller 14 to the upper level device 10.

The printing process start notification includes a notification from the upper level device 10 to the printer controller 14 indicating that the preparation of the print image data is completed and a response to the notification from the printer device 13 to the upper level device 10. The notification indicating that the preparation of the print image data is completed is notified in accordance with the sequence of the output of the print image data, page-by-page (process-by-process). It can be said that the page is a print unit by which a series of printing operation is performed.

The printing process request includes a notification of printing process from the printer controller 14 to the upper level device 10 and a response to the notification from the upper level device 10 to the printer controller 14. The printer controller 14 notifies the upper level device 10 of color information (yellow, cyan, magenta, or black) indicating the colors Y, C, M, and K to perform printing, a process identification number (process ID), and a plane identification number. Incidentally, the plane corresponds to each image based on each color print image data to be printed in one page. The printer controller 14 notifies these kinds of information for every plane in accordance with the sequence of requests from engine, i.e. the data transfer control units 30a, 30b, 30c and 30d. That is, the printer engine 15 retrieves the print image data composed of bitmap data from the upper level device 10.

As for the data transfer completion notification, the completion of transferring the print image data as for the requested plane is notified from the upper level device 10 to the printer controller 14. As for the data reception completion notification, the completion of receiving the print image data as for the requested plane is notified from the printer controller 14 to the upper level device 10. As for the printing process completion notification, the completion of print request for all pages (process) is notified from the upper level device 10 to the print controller 14. As for the process status report, the print status of pages (process) is notified from the printer controller 14 to the upper level device 10. At this time, the printer controller 14 acquires from the printer engine 15 the information about feeding or discharging of sheets or the information about the print start timing, and adds the acquired information to the completion notification. Then, the notification to which the acquired information is added is transmitted to the upper level device 10.

As for the SC notification, an acquisition of obstacle information is requested from the upper level device 10 to the printer controller 14. The obstacle information acquired according to the request is notified from the printer controller 14 to the upper level device 10. As for the error occurrence and removal, an occurrence of any error and a removal thereof at the upper level device 10 is notified from the upper level device 10 to the printer controller 14.

The information indicating printing conditions includes setting the printing conditions, that is, a notification of the printing conditions from the upper level device 10 to the printer controller 14 and a response from the printer controller 14 to the notification. Examples of the printing conditions include a printing form, a printing type, feeding/discharging information, printing surface order, a printing paper size, a print data size, resolution and gradation, and color information.

The printing form indicates, for example, whether both-sided printing or a single-sided printing is performed on the printing paper 201. The printing type indicates whether print image data exists and thus the print image data is printed or the print image data does not exist and thus a white page is output without printing the print image data. The feeding/discharging information indicates identification information, such as a stacker of a discharging destination or a feeding origin of the printing paper 201. The printing surface order indicates whether printing is performed from a front surface to a back surface of the printing paper 201 or is performed from the back surface to the front surface. The printing paper size indicates, for example, the length of a page to be printed in a conveyance direction of the printing paper 201, when continuous paper is used as the printing paper 201. The print data size indicates a data size of the print image data. That is, the print data size indicates a size of the print image data corresponding to one page. The resolution and gradation indicates resolution and gradation of the case where the print image data is printed on the printing paper 201. The color information indicates, for example, whether to perform printing using a full color in which the colors Y, C, M, and K are used, or to perform printing using a single color in which only the color K is used.

The information indicating the connection includes registration and release, and specifically includes registration of information in each opponent between the upper level device 10 and the printer controller 14, and release of the registered information.

<Printing Sequence>

Next, a printing process applicable to each embodiment will be described. FIG. 8 is a sequence diagram conceptually illustrating an example of the printing process that can be applied to each embodiment. In this case, full-color printing using the individual colors Y, C, M, and K is performed. If the printer controller 14 receives information related to the printing paper 201 as control information from the upper level device 10 (SEQ100), paper feeding length is set to the conveyance control unit 51 on the basis of the received information (SEQ110). The paper feeding length is, for example, a size of one page in a conveyance direction.

If the printer controller 14 receives control information indicating a job start of a first page (page #1) from the upper level device 10 (SEQ101), the printer controller 14 requests the data transfer control units 30a, 30b, 30c, and 30d to start data transfer of the first page with respect to the colors Y, C, M, and K (SEQ110a, SEQ110b, SEQ110c, and SEQ110d). The data transfer control unit 30a requests the upper level device 10 to transmit print image data of the first page of the color Y according to the request through the data line 11a, and stores the print image data of the first page of the color Y transmitted from the upper level device 10 in the memory 31a, according to the request.

Similar to the data transfer control unit 30a, the data transfer control units 30b, 30c, and 30d request the upper level device 10 to transmit the print image data of the individual colors C, M, and K of the first page through the data lines 11b, 11c, and 11d according to the requests from SEQ110b, SEQ110c, and SEQ110d. Each of the data transfer control units 30b, 30c, and 30d stores the print image data of the first page of the individual colors C, M, and K transmitted from the upper level device 10 according to the request in the memories 31b, 31c, and 31d.

Meanwhile, in the example of FIG. 8, while the data transfer of the first page is requested from the printer controller 14 to each of the data transfer control units 30a, 30b, 30c, and 30d, the printer controller 14 receives control information indicating a job start of the next second page transmitted from the upper level device 10 (SEQ102). The received control information is held in, for example, the RAM 323.

Once the print image data transfer of the first page of each color from the upper level device 10 ends, each of the data transfer control units 30a, 30b, 30c, and 30d notifies the printer controller 14 of the end of the transmission (SEQ111a, SEQ111b, SEQ111c, and SEQ111d). The printer controller 14 requests each of the data transfer control units 30a, 30b, 30c, and 30d to start the data transfer of the second page (page #2), in response to the notification (SEQ112a, SEQ112b, SEQ112c, and SEQ112d).

Each of the data transfer control units 30a, 30b, 30c, and 30d requests the upper level device 10 to transmit the print image data of the second page of each color, according to the request, and stores the print image data of the second page of each color transmitted from the upper level device 10 in the memories 31a, 31b, 31c, and 31d, according to the request.

Each of the data transfer control units 30a, 30b, 30c, and 30d can recognize the end of the data transfer on the basis of the data amount of the transmitted print image data. The information indicating the data amount of the printing image corresponding to one page, for example, is added to the head of the print image data by the upper level device 10 and is transmitted, when the data transfer starts with respect to each of the data transfer control units 30a, 30b, 30c, and 30d. In a case that a predetermined unit of the print image data is transferred, it may be configured that the upper level device 10 adds any end information for indicating the completion of transferring one page to the last transferred unit of the print image data corresponding to the end of one page. Alternatively, it may be configured that the upper level device 10 transmits any information for indicating the completion of transferring the print image data corresponding to one page to each transfer control unit 30a, 30b, 30c and 30d independently of the print image data, for example immediately after the print image data corresponding to one page is transferred.

Meanwhile, once the printer controller 14 receives the notification of the completion of transferring the data of the first page from all of the data transfer control units 30a, 30b, 30c, and 30d, the printer controller 14 requests the conveyance control unit 51 to start the paper conveyance (SEQ113). The conveyance control unit 51 starts conveyance at a predetermined speed of the printing paper 201 according to the request. The printer controller 14 requests the conveyance control unit 51 to start the paper conveyance and instructs each of the data transfer control units 30a, 30b, 30c, and 30d to start printing of the first page (SEQ114).

If the printing paper 201 reaches a predetermined position, the conveyance control unit 51 notifies the printer controller 14 of a printing enabled state (SEQ117). The printer controller 14 instructs each of the data transfer control units 30a, 30b, 30c and 30d of the print start position, according to the printing enabled state report from the conveyance control unit 51 (SEQ118).

Each of the data transfer control units 30a, 30b, 30c and 30d starts the printing operation according to the print start position instruction. In this example, the heads of the individual colors Y, C, M, and K are arranged in order of the heads 56a, 56b, 56c, and 56d along a conveyance direction of the printing paper 201. In this case, once the print start position of the first page in the printing paper 201 reaches a position to be printed by the head 56a, the data transfer control unit 30a firstly starts reading out the print image data of the first page from the memory 31a. The print image data of the color Y read from the memory 31a is transmitted to the image output unit 50. The print image data is supplied to the head 56a through the output control unit 55 and printing with respect to the printing paper 201 is performed (SEQ119a). Once printing the first page of the color Y is completed, the completed of the printing is notified to the printer controller 14 (SEQ120a).

Next, once the print start position of the first page in the printing paper 201 reaches a position to be printed by the head 56b, the data transfer control unit 30b starts reading out the print image data of the first page from the memory 31b. The print image data of the color C read from the memory 31b is transmitted to the image output unit 50. The print image data is supplied to the head 56b through the output control unit 55 and printing with respect to the printing paper 201 is performed (SEQ119b). Once printing the first page of the color C ends, the end of the printing is notified to the printer controller 14 (SEQ120b).

Hereinafter, in the same way as mentioned above, the printing operations with the colors M and K are sequentially started (SEQ119c and SEQ119d). Once the printing operations with the colors M and K are completed, the completion of the printing operation is notified to the printer controller 14 (SEQ120c and SEQ120d).

Meanwhile, once transferring each color print image data of the second page started at SEQ112a to SEQ112d are completed, each of the data transfer control units 30a, 30b, 30c and 30d notifies the printer controller 14 of the completion of transferring the data (SEQ115). The printer controller 14 instructs each of the data transfer control units 30a, 30b, 30c and 30d to start printing the second page, according to the data transfer completion notification (SEQ116).

Each of the data transfer control units 30a, 30b, 30c and 30d starts to print the second page after the completion of printing the first page. For example, when the print start position of the second page in the printing paper 201 reaches a position to be printed by the head 56a after the completion of printing the first page (SEQ120a), the data transfer control unit 30a reads out the print image data of the color Y of the second page from the memory 31a, supplies the print image data to the image output unit 50, and starts printing on the printing paper 201 (SEQ121a). Once the printing operation of the color Y is completed, the completion of the printing operation is notified to the printer controller 14 (SEQ122a).

In the same way, also in the data transfer control units 30b, 30c, and 30d, when the print start position of the second page reaches each position to be printed by the heads 56b, 56c, and 56d, each color print image data is read from the memories 31b, 31c and 31d, respectively, and printing with respect to the printing paper 201 is started (SEQ121b to SEQ121d). When the printing operation of each color is completed, the completion of the printing operation of each color is notified to the printer controller 14 (SEQ122b to SEQ122d).

Once the printer controller 14 receives the printing process completion notification of the color K of the second page from the data transfer control unit 30d, the printer controller 14 assumes that the printing operation of the final page according to the print job ends and requests the conveyance control unit 51 to stop conveyance of the printing paper 201 (SEQ123). The conveyance control unit 51 stops conveyance of the printing paper 201 according to the request and reports the stop of conveyance to the printer controller 14 (SEQ124). Thereby, a series of printing processes terminates.

<Detail of Printing Process>

Next, a printing process applicable to each embodiment will be described in detail. In each embodiment, each of the data transfer control units 30a to 30d acquires control information to control printing, from the upper level device 10, under the control of the printer controller 14. Each of the data transfer control units 30a to 30d stores print image data of each color transmitted from the upper level device 10 in the memories 31a to 31d, under the control of the printer controller 14.

A data transfer process of the print image data that can be applied to each embodiment will be described using flowcharts of FIGS. 9A to 9D. Hereinafter, the data lines 11a, 11b, 11c, and 11d transmit print image data of the colors Y, C, M and K, respectively, and the data transfer control units 30a, 30b, 30c and 30d control the transfer of the print image data of the colors Y, C, M and K, respectively.

Figure 9A:
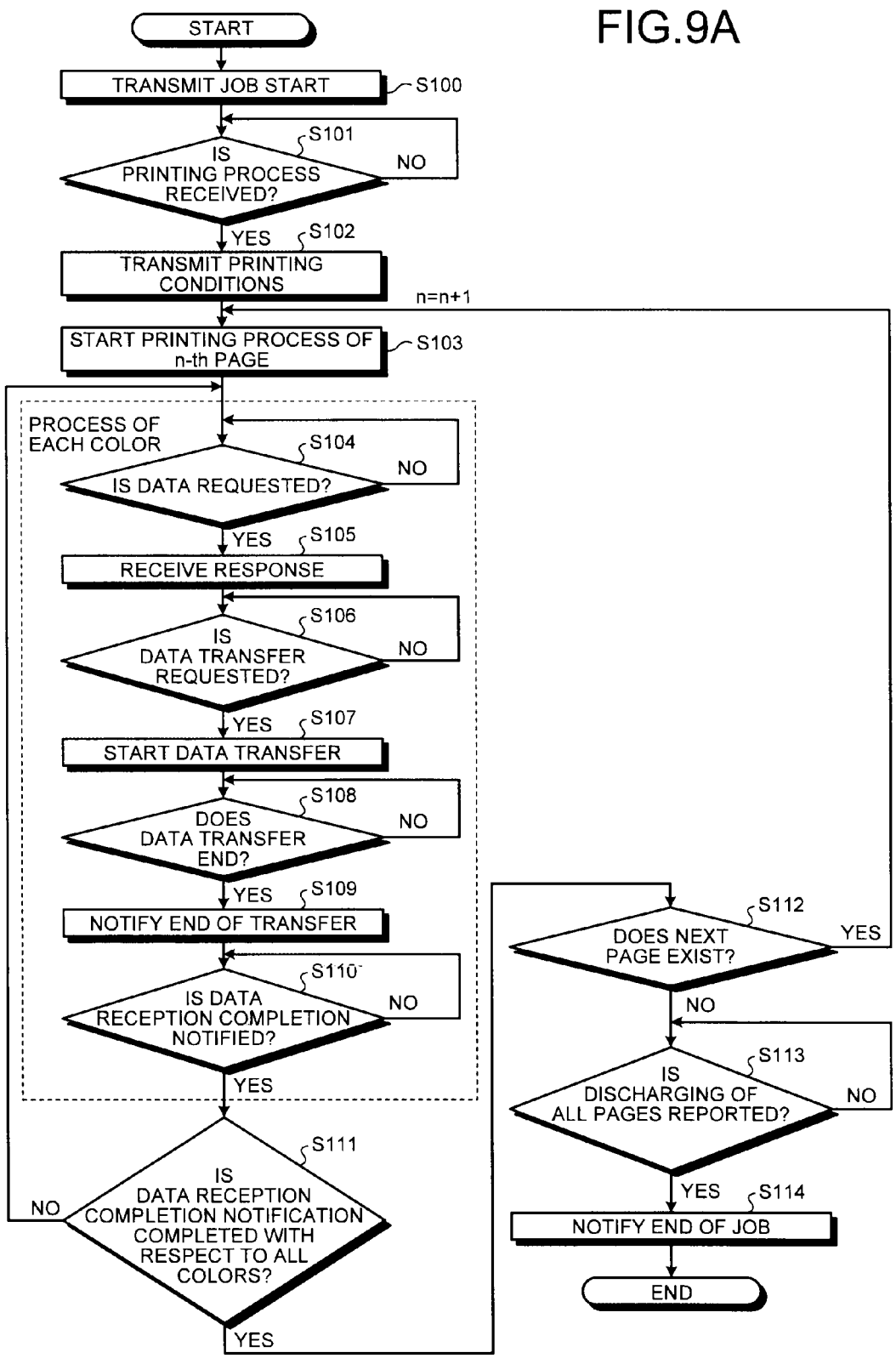
FIG. 9A is a flowchart illustrating an example of a process of the upper level device that can be applied to each embodiment of the present invention.

FIG. 9A is a flowchart illustrating an example of a process in the upper level device 10 relating to data transfer. Once the upper level device 10 receives job data from the host device 5, the upper level device 10 transmits control information indicating a job start to the printer controller 14 through the control line 12, in step S100. The upper level device 10 stands by a control signal that is transmitted from the printer controller 14 in response to the control signal and indicates printing process reception (step S101).

Once the upper level device 10 receives the control signal indicating the printing process reception from the printer controller 14, the upper level device 10 transmits control information indicating printing conditions in job data to the printer controller 14 through the control line 12 in step S102. Next, in step S103, the upper level device 10 sets a page number to "n" and transmits a control signal to control a printing process start of the n-th page to the printer controller 14 through the control line 12. The processes from step S103 to step S112 are executed in a page unit.

The processes of steps S104 to S110 become processes that are executed on the individual colors of Y, C, M, and K. Hereinafter, a process that is related to the color Y will be mainly described. In step S104, the upper level device 10 stands by a request for transmission of the print image data of the color Y from the printer controller 14. Once the upper level device 10 receives a data transfer request transmitted from the printer controller 14 through the control line 12, the upper level device 10 transmits a response to the received data request to the printer controller 14 in step S105. Next, in step S106, the upper level device 10 stands by a data transfer request that is transmitted from the data transfer control unit 30a through the data line 11a.

Once the upper level device 10 receives the data transfer request from the data transfer control unit 30a through the data line 11a, the upper level device 10 starts the transfer of the print image data of the color Y with respect to the data transfer control unit 30a in step S107. The print image data of the color Y is transmitted to the data transfer control unit 30a through the data line 11a. At this time, the upper level device 10 adds information indicating a size of the print image data to the transmitted print image data of the color Y.

In step S108, the upper level device 10 stands by the completion of transferring the data corresponding to one page of the color Y. Referring to FIG. 2B, the upper level device 10 monitors the storage unit 122 and the interface 123 using the control unit 124 and determines whether transferring the data corresponding to one page is performed with respect to the individual colors Y, C, M, and K. When it is determined that the transfer of the data corresponding to one page of the color Y terminates, the upper level device 10 makes the process proceed to step S109 and the data transfer completion notification indicating that the transfer of the data corresponding to one page terminates is transmitted to the printer controller 14 through the control line 12. In step S110, the upper level device 10 stands by a data reception completion notification with respect to the color Y, from the printer controller 14.

In step S111, the upper level device 10 determines whether the data reception completion notification is received for all of the colors Y, C, M, and K. When it is determined that the data reception completion notification is not received, the process returns to step S104 and the upper level device 10 executes a process on the next color.

In FIG. 9A, the processes of steps S104 to S110 has been described to be sequentially executed with respect to the individual colors Y, C, M, and K. However, the present invention is not limited thereto. For example, the processes of steps S104 to S110 may be executed in parallel with respect to the individual colors Y, C, M, and K. In this case, in step S111, the upper level device 10 stands by the data reception completion notification in step S110 in the processes of the individual colors Y, C, M, and K.

Once the upper level device 10 determines that the data reception completion notifications is received with respect to all of the colors of Y, C, M, and K in step S111, the upper level device 10 makes the process proceed to step S112 and determines whether a printing process of the next page is executed. The number of pages to be printed can be acquired from the print job data that is received from the host device 5. When it is determined that the printing process of the next page exists, the page number n becomes n+1 and the process returns to step S103.

Meanwhile, when it is determined that transmission of the data corresponding to all of the pages in the print job data terminates, the upper level device 10 makes the process proceed to step S113 and stands by transmission of a discharging report of all of the pages from the printer controller 14. When the upper level device 10 receives the discharging report of all of the pages from the printer controller 14, the upper level device 10 makes the process proceed to step S114 and the upper level device 10 transmits a job end notification indicating that all of the print jobs end to the printer controller 14 through the control line 12.

Figure 9B:
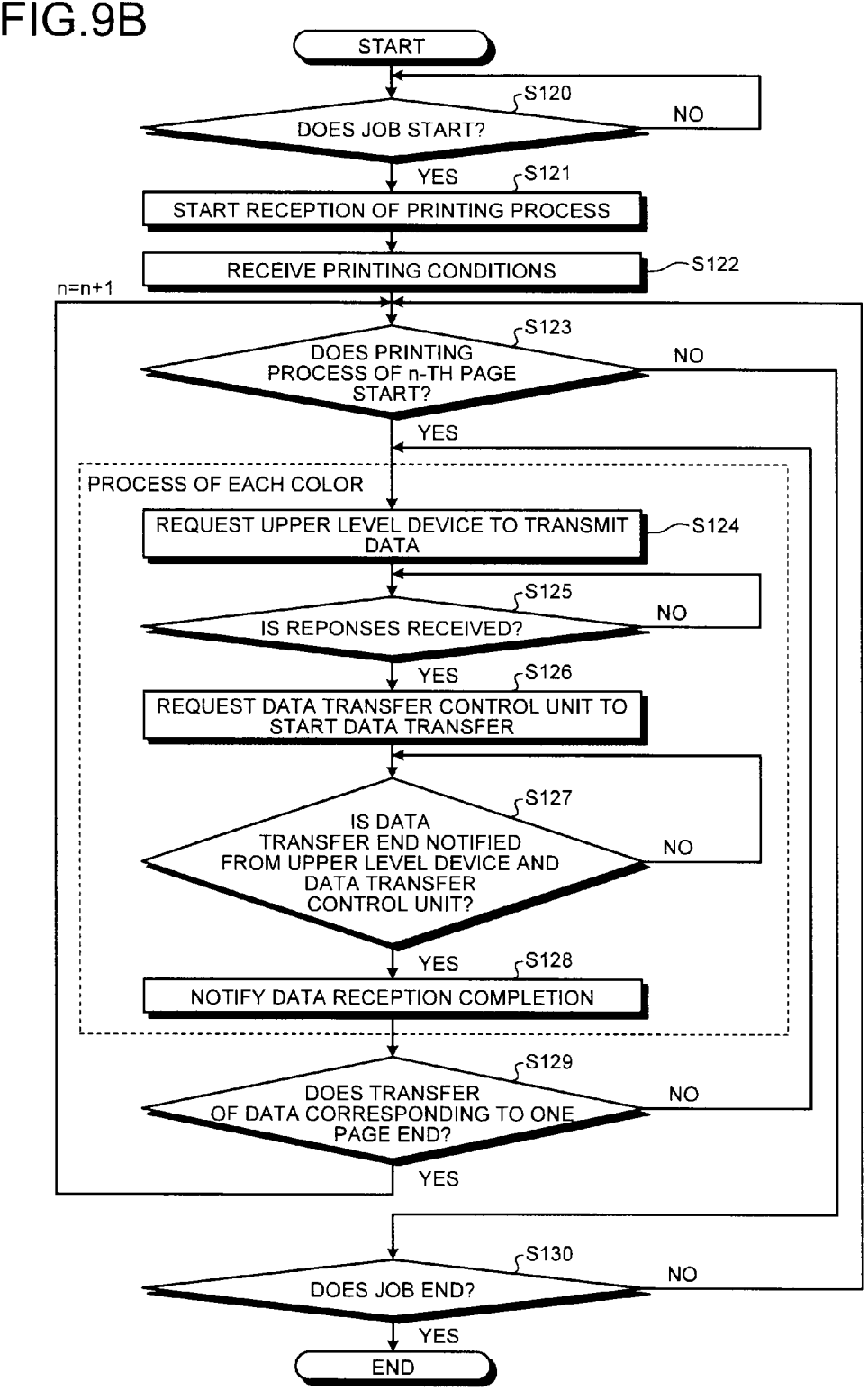
FIG. 9B is a flowchart illustrating an example of a process of a printer controller that can be applied to each embodiment of the present invention.

FIG. 9B is a flowchart illustrating an example of a process in the printer controller 14 relating to the data transfer. In step S120, the printer controller 14 stands by the control information indicating the job start transmitted from the upper level device 10 through the control line 12. Once the printer controller 14 receives the control information, the printer controller 14 returns a response to the upper level device 10 through the control line 12, in the next step S121. In step S121, the printer controller 14 transmits the control information indicating the printing process reception start to the upper level device 10 through the control line 12. In the next step S122, the printer controller 14 receives the control information indicating the printing conditions that is transmitted from the upper level device 10 through the control line 12.

In the next step S123, the printer controller 14 determines whether the control signal transmitted from the upper level device 10 through the control line 12 and indicating the printing process start of the n-th page is received. When it is determined that the control signal is not received, the printer controller 14 makes the process proceed to step S130 and determines whether the job end notification is received from the upper level device 10 through the control line 12. When it is determined that the job end notification is not received, the process returns to step S123. Meanwhile, when it is determined that the job end notification is received in step S130, a series of printing processes terminates.

In step S123, when it is determined that the control signal transmitted from the upper level device 10 through the control line 12 and indicating the printing process start is received, the printer controller 14 makes the process proceed to step S124. The subsequent processes of steps S124 to S128 become the processes of the individual colors Y, C, M, and K. In this case, a transfer process of the print image data of the color Y will be described.

In step S124, the printer controller 14 requests the upper level device 10 to transfer the print image data through the control line 12. Next, in step S125, the printer controller 14 stands by a response from the upper level device 10 with respect to the request. Once the printer controller 14 receives the response from the upper level device 10, the printer controller 14 requests the data transfer control unit 30a to start to transfer the data through the engine I/F control line 40a in step S126.

At this time, the printer controller 14 extracts a page identifier PBID indicating a page (n-th page) to perform printing and a transfer origin address indicating an address of a transfer origin of the print image data, from a transfer management table to be described below using FIG. 15. The printer controller 14 adds the extracted page identifier PBID and transfer origin address to the data transfer start request for requesting to start the data transfer and transmits it to the data transfer control unit 30a in next step S126.

In next step S127, the printer controller 14 stands by the data transfer completion notification from the upper level device 10 and the data transfer completion notification from the data transfer control unit 30a. Once the data transfer completion notification is received from the upper level device 10 and the data transfer control unit 30a through the control line 12 and the engine I/F control line 40a, the printer controller 14 makes the process proceed to step S128 and transmits the data reception completion notification with respect to the color Y to the upper level device 10 through the control line 12.

In step S129, the printer controller 14 determines whether the data transfer of all of the colors of Y, C, M, and K terminates. When it is determined that the data transfer does not terminate, the printer controller 14 makes the process to return to step S124 and executes the process with respect to the next color. Meanwhile, when it is determined that the data transfer of all of the colors Y, C, M, and K ends in step S129, the printer controller 14 sets the page number "n" to "n+1" and returns the process to step S123.

In FIG. 9B, the processes of steps S124 to S128 are sequentially executed with respect to the individual colors Y, C, M, and K. However, the present invention is not limited thereto. For example, the processes of steps S124 to S128 may be executed in parallel with respect to the individual colors Y, C, M, and K. In this case, in step S129, the printer controller 14 stands by the data reception completion notification in step S128 in the processes of the individual colors Y, C, M, and K.

The printer controller 14 transmits a printing instruction to the data transfer control units 30a to 30d through each of the engine I/F control lines 40a to 40d. By the printing instruction, the print image data is read from the memories 31a to 31d in the data transfer control units 30a to 30d and printing of the print image data with respect to the printing paper is executed.

The printing instructions that are transmitted from the printer controller 14 to the individual data transfer control units 30a to 30d can be generated as a table based on information needed to perform printing, which is setting information of printing conditions, among the control information described using FIG. 7. The printer controller 14 transmits the table generated in the above-described way to each of the data transfer control units 30a to 30d.

FIG. 9C is a flowchart illustrating an example of a process that is executed when the printer controller 14 instructs printing. Before the flowchart is executed, the printer controller 14 transmits a printing preparation instruction to the conveyance control unit 51.

In step S140, the printer controller 14 determines whether the job end notification is transmitted from the upper level device 10. When it is determined that the job end notification is transmitted, the printer controller 14 terminates a series of processes. When it is determined that the job end notification is not transmitted from the upper level device 10, the printer controller 14 makes the process proceed to step S141.

In step S141, the printer controller 14 stands by the completion of transferring the print image data corresponding to at least one page with respect to each of the colors Y, C, M, and K. When it is determined that the transfer of the print image data corresponding to one page terminates, the printer controller 14 makes the process proceed to step S142 to stand by reception of a response indicating the printing preparation completion from the conveyance control unit 51. Once the printer controller 14 receives the response indicating the printing preparation completion transmitted from the conveyance control unit 51 through the conveyance control line 41, the printer controller 14 transmits a printing instruction to instruct to perform printing of the n-th page to the data transfer control units 30a to 30d through the engine I/F control lines 40a to 40d, respectively in step S143.

Figure 9D:
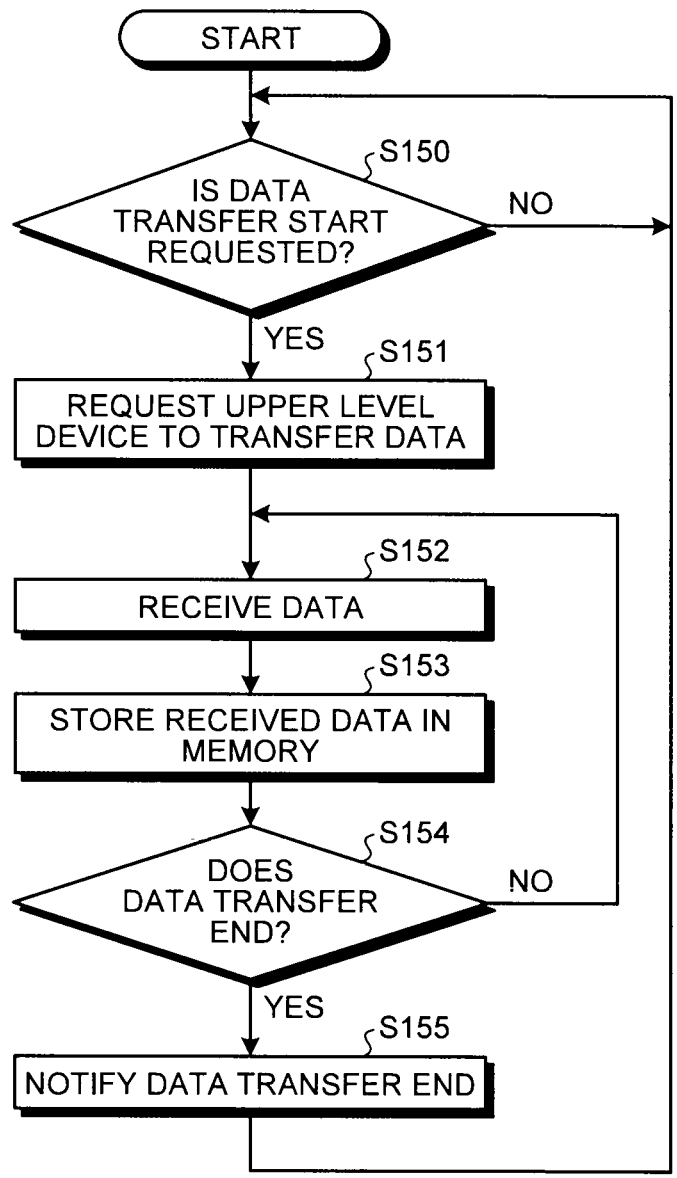
FIG. 9D is a flowchart illustrating an example of a process of each data transfer control unit that can be applied to each embodiment of the present invention.

FIG. 9D is a flowchart illustrating an example of a process in each of the data transfer control units 30a to 30d relating to the data transfer. In this case, in order to simplify the description, the process in the color Y and the data transfer control unit 30a will be described. In step S150, the data transfer control unit 30a stands by a data transfer start request that is transmitted from the printer controller 14 through the engine I/F control line 40a.

Once the data transfer control unit 30a receives the data transfer start request, the data transfer control unit 30a transmits a data transfer request to request to transfer the print image data of the color Y to the upper level device 10 through the data line 11a in step S151. The print image data of the color Y that is transmitted from the upper level device 10 through the data line 11a according to the data transfer request is received by the data transfer control unit 30a (step S152). The data transfer control unit 30a controls a data transfer DMA 133a and stores the received print image data of the color Y in a predetermined area of the memory 31a (step S153).

In step S154, the data transfer control unit 30a determines whether the transfer of the print image data of the color Y from the upper level device 10 terminates. The data transfer control unit 30a can determine whether the transfer of the print image data terminates, on the basis of size information added to the transferred print image data. When it is determined that the transfer of the print image data does not terminate, the data transfer control unit 30a makes the process return to step S152 and continues to receive data and store the data in the memory 31a. Meanwhile, when it is determined that the transfer of the print image data terminates, the process proceeds to step S155. The data transfer control unit 30a transmits the data transfer completion notification to the printer controller 14 through the engine I/F control line 40a. Then, the process returns to step S150.

Figure 10B:
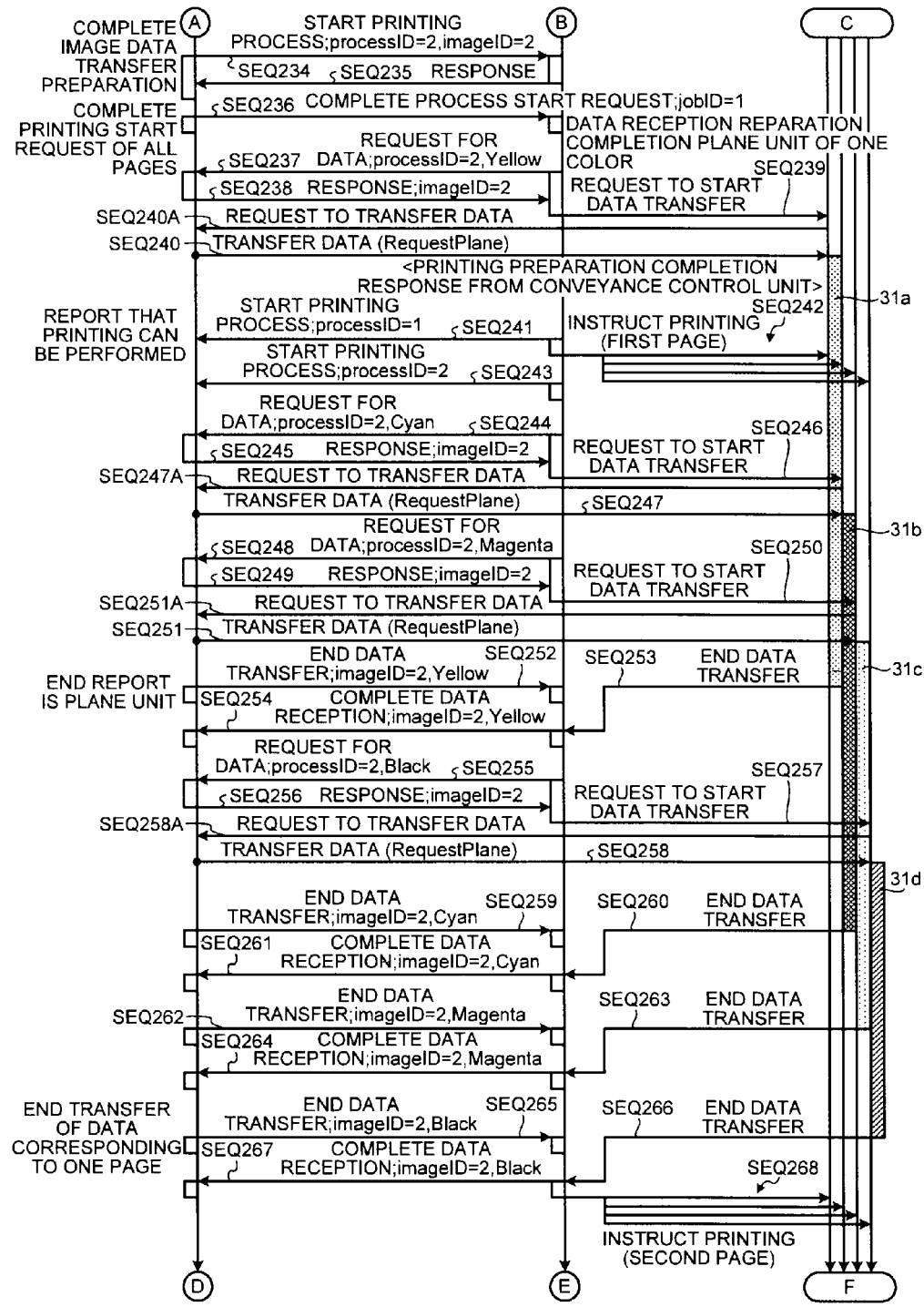
FIG. 10B is a sequence diagram specifically illustrating an example of a printing process that can be applied to each embodiment of the present invention.
Figure 10C:
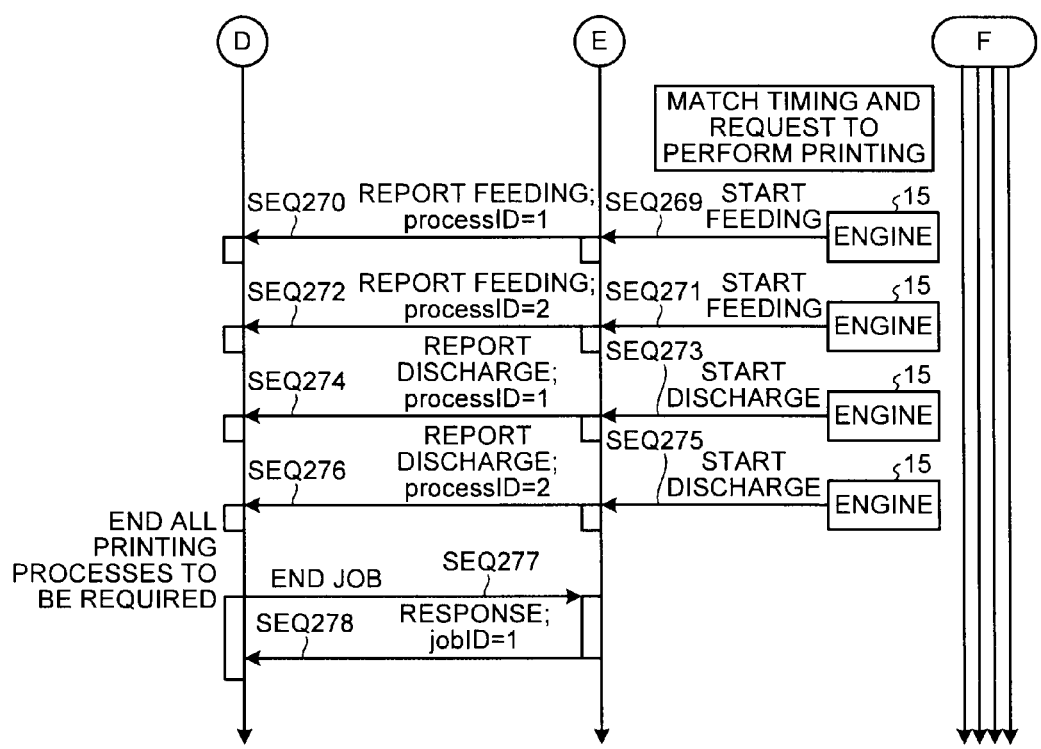
FIG. 10C is a sequence diagram specifically illustrating an example of a printing process that can be applied to each embodiment of the present invention.

FIGS. 10A to 10C are sequence diagrams specifically illustrating an example of a printing process that can be applied to each embodiment realized according to each flowchart illustrated in FIGS. 9A to 9D. In FIGS. 10A to 10C, reference numerals A to F indicate that the process proceeds to the corresponding reference numerals between the different drawings. Hereinafter, it is assumed that a print job is to perform printing corresponding to two pages.

Referring to FIG. 10A, first, control information of the print job is transmitted from the upper level device 10 to the printer controller 14 through the control line 12 (SEQ200). The printer controller 14 transmits control information indicating the job identifier jobID=1 responding to the control information to the upper level device 10 through the control line 12 (SEQ201). The printer controller 14 acquires resources to execute a job according to the start of the job. The printer controller 14 transmits control information indicating a printing process reception start to the upper level device 10 through the control line 12 (SEQ202).

Next, the upper level device 10 transmits control information to determine printing conditions to the printer controller 14 through the control line 12 (SEQ203). The printing conditions that are set to the printer controller 14 include a printing form, a printing type, feeding/discharging information, order of printing surfaces, a size of printing paper, a data size of print image data, resolution and gradation, and color information as described with reference to FIG. 7. Further, the printing conditions may include information of the number of pages to be printed. Once the control information is received in the printer controller 14, the various printing conditions that are included in the received control information are written in a register of the printer controller 14, for example, and the printing conditions are set.

Next, the upper level device 10 transmits the control information of the printing process start of the first page to the printer controller 14 through the control line 12 (SEQ204). The control information includes a process identification number processID=1 to identify the process and an image identification number imageID=1 indicating an image constituting the first page. The printer controller 14 returns control information of the printing process start to be a response to the printing process start, to the upper level device 10 (SEQ205).

Next, the printer controller 14 transmits control information of the printing process request to the upper level device 10 and requests the upper level device 10 to transmit the print image data. The printing process request is sequentially processed in arrangement order of the colors of the printer engine 15, with respect to the individual colors Y, C, M, and K. In this example, the heads of the colors Y, C, M, and K along a conveyance direction of the printing paper 201 are arranged in order of the heads 56a, 56b, 56c, and 56d.

First, the printer controller 14 transmits the control information of the printing process request to request to transmit the print image data of the color Y to the upper level device 10 through the control line 12 (SEQ206). The control information includes process identification number processID=1 to designate a process and color information Yellow to designate the color Y. The upper level device 10 returns the control information including the image identification number imageID=1 to the printer controller 14 in response to the control information (SEQ207). Once the printer controller 14 receives the control information, the printer controller 14 requests the data transfer control unit 30a corresponding to the color Y to start to transmit the print image data (SEQ208). At this time, the printer controller 14 transmits a data size of the print image data requiring the start of the transmission and the request to the data transfer control unit 30a.

The data transfer control unit 30a receives the request and requests the upper level device 10 to transmit the print image data of the plane of the color Y through the data line 11a (SEQ209A), and the print image data of the color Y is transmitted from the upper level device 10 to the data transfer control unit 30a (SEQ209) according to the request. The transmitted print image data is stored in an area in the memory 31a of the data transfer control unit 30a that is allocated for the print image data of the first page.

Hereinafter, the same processes as those of SEQ206, SEQ207, SEQ208, SEQ209A, and SEQ209 are repeated with respect to each of the other colors C, M, and K, the print image data of each color is transmitted from the upper level device 10 to the data transfer control units 30b, 30c, and 30d through the data lines 11b, 11c, and 11d and are stored in the areas of the memories 31b, 31c, and 31d that are allocated for the print image data of the first page (SEQ210 to SEQ221).

Once the print image data transfer of one plane completes, the upper level device 10 transmits the control information of the data transfer completion to the printer controller 14. The printer controller 14 transmits the control information of the reception completion of the print image data to the upper level device 10, according to the control information.

For example, once the print image data transfer of the plane of the color Y completes, the upper level device 10 transmits the control information of the data transfer completion including the image identification number imageID=1 and the color information Yellow to the printer controller 14 (SEQ222). Meanwhile, once the print image data transfer from the upper level device 10 through the data line 11*a* completes, the data transfer control unit 30*a* notifies the printer controller 14 of the completion of the transfer (SEQ223). The printer controller 14 transmits the control information of the data reception completion including the image identification number imageID=1 and the color information Yellow to the upper level device 10, in response to the notification (SEQ224).

Hereinafter, the same processes as those of SEQ222 to SEQ224 are repeated with respect to other colors C, M, and K, respectively, in accordance with the completion of transferring each print image data. And the control information of the data reception completion is transmitted to the upper level device 10 (SEQ225 to SEQ233).

After the printer controller 14 transmits the control information of the data reception completion with respect to the final print image data (that is, print image data of the color K) of the first page to the upper level device 10 at SEQ233, the printer controller 14 instructs the conveyance control unit 51 to prepare for printing. The conveyance control unit 51 starts to convey the printing paper 201 to the printing position, according to the instruction.

The description proceeds to FIG. 10B. Once the print image data transfer of each color of the first page is completed, the upper level device 10 transmits the control information of the printing process start of the second page to the printer controller 14 through the control line 12 (SEQ234). The control information includes the process identification number processID=2 to identify the process of the second page and the image identification number imageID=2 indicating the image constituting the second page. The printer controller 14 returns the control information of the printing process start to be a response to the printing process start to the upper level device 10 (SEQ235).

For example, when printing of the second page is performed, the printing process start request is completed by the processes of SEQ234 and SEQ235. For this reason, once the upper level device 10 receives the response to the printing process start request of the second page at SEQ235, the upper level device 10 transmits the control information of the process start request completion where the job identifier jobID=1 is designated to the printer controller 14, at SEQ236.

Next, similar to SEQ206 to SEQ221, the printer controller 14 transmits the control information of the printing process request to the upper level device 10 and requests the upper level device 10 to transmit the print image data. The printing process request is sequentially processed according to arrangement order of the colors in the printer engine 15, with respect to each of the colors Y, C, M, and K.

First, the printer controller 14 transmits the control information of the printing process request to request to transmit the print image data of the color Y to the upper level device 10 through the control line 12 (SEQ237). The control information includes the process identification number processID=2 to designate the process and the color information Yellow to designate the color Y. The upper level device 10 returns the control information including the image identification number imageID=2 to the printer controller 14, in response to the control information (SEQ238). Once the printer controller 14 receives the control information, the printer controller 14 requests the data transfer control unit 30*a* corresponding to the color Y to start to transmit the print image data (SEQ239).

The data transfer control unit 30*a* receives the request and requests the upper level device 10 to transmit the print image data of the plane of the color Y through the data line 11*a* (SEQ240A), and the print image data of the color Y is transmitted from the upper level device 10 to the data transfer control unit 30*a* according to the request (SEQ240). The transmitted print image data is stored in an area in the memory 31*a* of the data transfer control unit 30*a* that is allocated for the print image data of the second page.

Hereinafter, the same processes as those of SEQ237, SEQ238, SEQ239, SEQ240A, and SEQ240 are repeated with respect to each of the other colors C, M, and K, the print image data of each color is transmitted from the upper level device 10 to the data transfer control units 30*b*, 30*c*, and 30*d* through the data lines 11*b*, 11*c*, and 11*d* and are stored in the areas of the memories 31*b*, 31*c*, and 31*d* that are allocated for the print image data of the second page (SEQ244 to SEQ251 and SEQ255 to SEQ258).

Similar to the above case, the upper level device 10 transmits the control information of the data transfer completion to the printer controller 14, whenever the transmission of the print image data of one plane ends. The printer controller 14 transmits the control information of the reception completion of the print image data to the upper level device 10, in response to the control information.

In the example of FIG. 10B, once the print image data transfer of the color Y at SEQ240 completes, the upper level device 10 transmits the control information of the data transfer completion to the printer controller 14 (SEQ252). Once the print image data transfer from the upper level device 10 through the data line 11*a* completes, the data transfer control unit 30*a* transmits the notification indicating the completion of the transfer to the printer controller 14 (SEQ253). The printer controller 14 transmits the control information of the data reception completion including the image identification number imageID=2 and the color information Yellow to the upper level device 10, in response to the notification (SEQ254).

Hereinafter, the same processes as those of SEQ252 to SEQ254 are repeated with respect to each of the other colors C, M, and K according to the completion of transferring each print image data, and the control information of the data reception completion is transmitted to the upper level device 10 (SEQ259 to SEQ267).

In the example of FIG. 10B, the response indicating that the printing preparation from the conveyance control unit 51 is completed according to the instruction of the printing preparation with respect to the conveyance control unit 51 immediately before SEQ234 described above is notified from the conveyance control unit 51 to the printer controller 14 immediately after SEQ240. Once the printer controller 14 receives the notification, the printer controller 14 transmits the two items of control information of the printing process start of the process identification number processID=1 and the process identification number processID=2 to the upper level device 10 (SEQ241 and SEQ243). Thereby, the notification indicating that it is ready to perform the printing of the first page and the second page is transmitted to the upper level device 10.

At the time point of SEQ241, the transfers of each color print image data of the first page with respect to the data transfer control units 30*a*, 30*b*, 30*c*, and 30*d* are completed. For this reason, the printer controller 14 notifies each of the data transfer control units 30*a*, 30*b*, 30*c*, and 30*d* of a printing instruction to perform printing of the first page (SEQ242). The printing instructions are stored in the memories 31a, 31b, 31c, and 31d in the data transfer control units 30a, 30b, 30c, and 30d. The actual print operation according to the printing instruction is executed by matching timing with timing of a print operation of a page to be executed hereinafter.

In the example of FIG. 10B, in the printer controller 14, the request with respect to the upper level device 10 of the print image data of the plane of the color C where transfer secondly starts is delayed due to transmission of the control information of the printing process start of SEQ241 and SEQ243 (refer to SEQ244). Due to the delay, the transfer of the print image data of the plane of the color Y where the transfer first starts may be completed before the transfer of the print image data of the plane of the color K starts (refer to SEQ253). After the notification process of the transfer completion of the print image data of the plane of the color Y (SEQ253), the transfer of the print image data of the plane of the color K starts (SEQ257 and SEQ258).

During the data transfer process of the first page illustrated in FIG. 10A, after the transfer of the print image data of each color is performed in order of the colors and the transfer of the print image data ends, the data transfer end process is executed in order of the colors. Meanwhile, during the data transfer process of the second page that is illustrated in FIG. 10B, the data transfer end process may start before the transmission of the print image data of each color ends.

As described above, the data transfer control units 30a, 30b, 30c, and 30d to control the transmission of the data of the colors Y, C, M, and K are independently configured and the printer controller 14 can independently communicate with the data transfer control units 30a, 30b, 30c, and 30d. The data transfer control units 30a, 30b, 30c, and 30d independently execute the process. For this reason, the process does not need to be changed, even though another process is interrupted during a series of processes executed by the data transfer control units 30a, 30b, 30c, and 30d.

At SEQ267, once the printer controller 14 notifies the upper level device 10 of completion of transmission of the print image data of the plane of the color K, the printer controller 14 notifies each of the data transfer control units 30a, 30b, 30c, and 30d of a printing instruction to instruct to perform printing of the second page (SEQ268).

The description proceeds to FIG. 10C. In the printer engine 15, printing of the first page is executed according to a printing instruction of SEQ242 and feeding of the printing paper 201 starts. The printer engine 15 notifies the printer controller 14 of the feeding start of the first page (SEQ269). Once the printer controller 14 receives the notification, the printer controller 14 transmits control information indicating that the process identification number processID is set to 1 and feeding of the first page starts, to the upper level device 10 (SEQ270). In addition, the printer controller 14 instructs the data transfer control units 30a, 30b, 30c, and 30d to execute printing in synchronization with each other. According to the printing instruction, the data transfer control units 30a, 30b, 30c, and 30d read the print image data of the colors Y, C, M, and K from the memories 31a, 31b, 31c, and 31d and sequentially execute printing of each plane of the first page with respect to the printing paper 201.

Similarly, once printing of the first page is completed and printing of the second page starts, the printer engine 15 notifies the printer controller 14 of the feeding start of the second page (SEQ271). Once the printer controller 14 receives the notification, the printer controller 14 transmits control information indicating that the process identification number processID is set to 2 and feeding of the second page starts, to the upper level device 10 (SEQ272). In addition, the printer controller 14 instructs the data transfer control units 30a, 30b, 30c, and 30d to execute printing in synchronization with each other. According to the printing instruction, the data transfer control units 30a, 30b, 30c, and 30d read the print image data of the colors Y, C, M, and K from the memories 31a, 31b, 31c, and 31d and sequentially execute printing of each plane of the second page with respect to the printing paper 201.

Once printing of each color of the first page ends and the first page of the printing paper 201 is discharged, the printer engine 15 notifies the printer controller 14 of the end of the printing and the discharge of the first page (SEQ273). Once the printer controller 14 receives the notification, the printer controller 14 transmits control information indicating that the process identification number processID is set to 1 and the printing paper 201 of the first page is discharged, to the upper level device 10 (SEQ274). Similar to the above case, once printing of each color of the second page ends and the second page of the printing paper 201 is discharged, the printer engine 15 notifies the printer controller 14 of the end of the printing and the discharge of the second page (SEQ275). The printer controller 14 transmits control information indicating that the process identification number processID is set to 2 and the printing paper 201 of the second page is discharged, to the upper level device 10, in response to the notification (SEQ276).

Once the upper level device 10 receives a discharge report corresponding to information indicating the number of pages to be printed included in the control information of setting of the printing conditions from the printer controller 14 at SEQ203, the upper level device 10 determines that the printing based on the job where the start is notified at SEQ200 ends, and transmits control information of the end of the job of the job identification number jobID=1 to the printer controller 14 (SEQ277). Once the printer controller 14 receives the control information, the printer controller 14 sets the job identification number jobID=1 and transmits control information of the response to the upper level device 10 (SEQ278). Accordingly, a series of printing processes ends.

As described above, the functions conventionally executed by each color data transfer control unit, such as the control of the transmission timing of the print image data from the upper level device 10 or the exchange of the control information with the upper level device 10, are collectively performed by the printer controller 14. The data transfer control units (data transfer control units 30a to 30d) that correspond to the individual colors only receive and read the print image data. For this reason, the transmission process of the print image data can be executed at a high speed.

The data transfer control units 30a, 30b, 30c, and 30d that control the transmission of the data of the individual colors Y, C, M, and K are independently configured. In addition, the printer controller 14 and the data transfer control units 30a, 30b, 30c, and 30d are connected by the engine I/F control lines 40a, 40b, 40c, and 40d, and communication between the printer controller 14 and the data transfer control units 30a, 30b, 30c, and 30d is independently performed by the data transfer control units 30a, 30b, 30c, and 30d. The data transfer control units 30a, 30b, 30c, and 30d independently execute the processes.

For this reason, the process does not need to be changed, even though another process is interrupted during a series of processes executed by the data transfer control units 30a, 30b, 30c, and 30d, from SEQ237 to SEQ266. Since the processes of the data transfer control units 30a, 30b, 30c, and 30d are independently executed, addition or removal of the data transfer control units 30a, 30b, 30c, and 30d can be easily performed and various variations of the system configuration can be provided with the common configuration.

<Another Example of Data Transfer Process>

Next, another example of the data transfer process will be described. In the above example, when the transfer process of the print image data of each color is executed, the upper level device 10 transfers the print image data of each color according to the data transfer request transmitted from the data transfer control units 30a to 30d of the individual colors through the data lines 11a to 11d. Meanwhile, in this example, the data transfer request is not transmitted from the data transfer control units 30a to 30d to the upper level device 10. After responding to the data request from the printer controller 14, the upper level device 10 directly transmits the print image data of each color to the data transfer control units 30a to 30d through the data lines 11a to 11d.

Figure 11A:
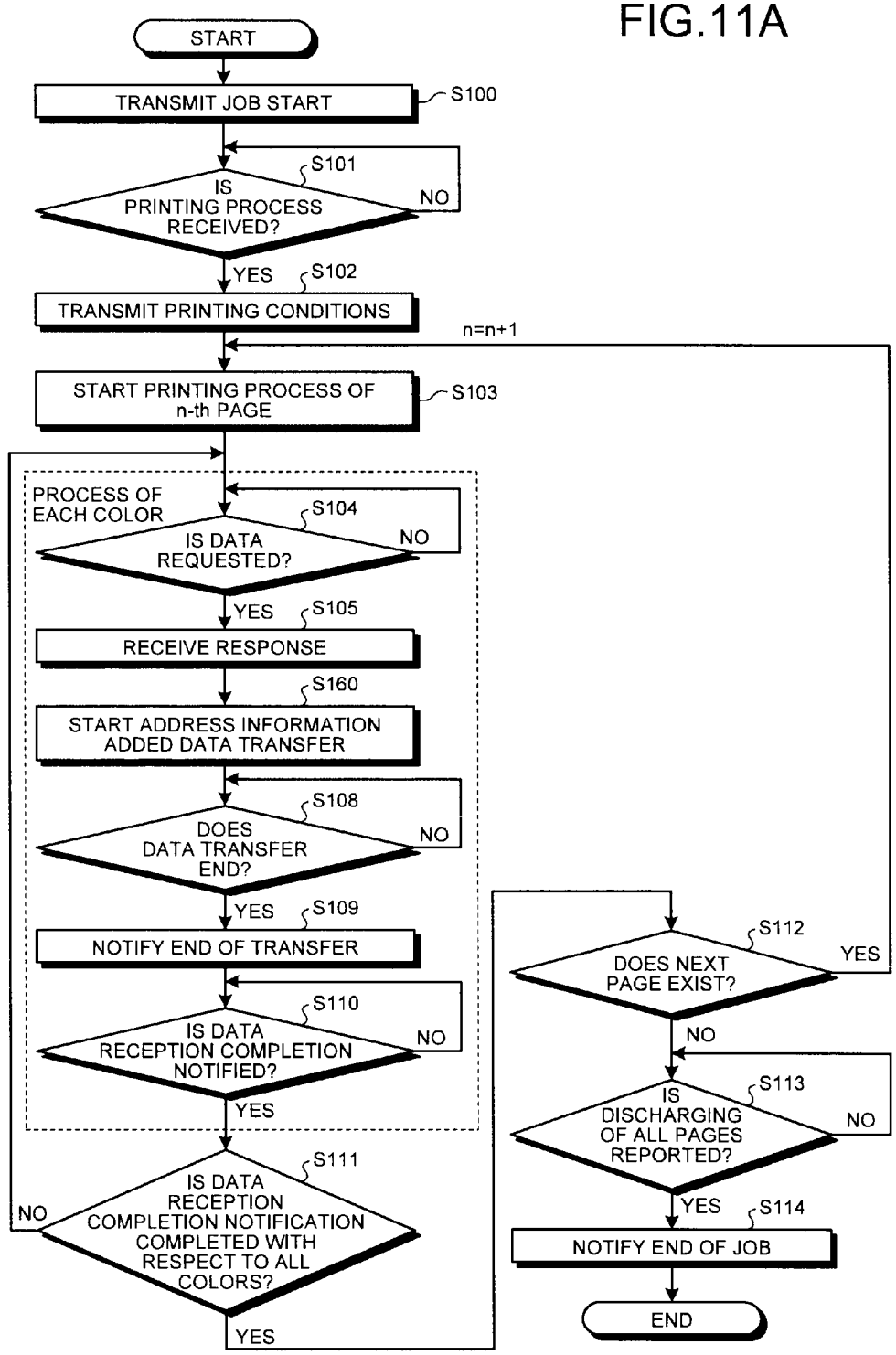
FIG. 11A is a flowchart illustrating another example of a process of the upper level device that can be applied to each embodiment.

The data transfer process of the print image data according to another example of the data transfer process will be described using flowcharts of FIGS. 11A and 11B. FIG. 11A is a flowchart illustrating an example of a process in the upper level device 10 according to the data transfer of this example. In FIG. 11A, the processes that are common to those of FIG. 9A described above are denoted by the same reference numerals and the redundant description will not be repeated.

As illustrated in the flowchart of FIG. 11A, the process of the upper level device 10 is the same as the process illustrated in FIG. 9A in the process until the response with respect to the data request from the printer controller 14 of step S105 is returned to the printer controller 14 from the transmission of the control information indicating the job start of step S100. Therefore, the redundant description will not be repeated.

In this example, after transmitting the response to the data request from the printer controller 14 to the printer controller 14 through the control line 12 in step S105, the upper level device 10 makes the process proceed to step S160. In step S160, the upper level device 10 transmits the print image data of the color Y to the data transfer control unit 30a through the data line 11a and stores the print image data in the memory 31a in the data transfer control unit 30a. At this time, the upper level device 10 adds the address information of the memory 31a to the transmitted print image data and transmits the print image data to the data transfer control unit 30a. The data transfer control unit 30a stores the print image data in the memory 31a, according to the address information added to the print image data.

The upper level device 10 executes the transmission process of the print image data of step S160 by the predetermined amount, for example, until the transmission of the print image data corresponding to one page ends. When it is determined that the transmission of the print image data ends in step S108, the upper level device 10 transmits the data transfer end notification to the printer controller 14 through the control line 12 in step S109, and stands by a response to the notification, from the printer controller 14, in step S110. Since the following processes are the same as those illustrated in FIG. 9A, the redundant description will not be repeated.

In this example, since the data transfer process and the printing instruction process in the printer controller 14 are the same as the processes descried using FIGS. 9B and 9C, the redundant description will not be repeated.

FIG. 11B is a flowchart illustrating another example of a process in the data transfer control unit 30a that is related to the data transfer. In FIG. 11B, components that are common to those of FIG. 9D are denoted by the same reference numerals and the redundant description will not be repeated.

In step S150, the data transfer control unit 30a stands by a data transfer start request transmitted from the printer controller 14 through the engine I/F control line 40a. Once the data transfer control unit 30a receives the data transfer start request from the printer controller 14, the data transfer control unit 30a makes the process proceed to step S161 and receives the print image data of the color Y transmitted from the upper level device 10 through the data line 11a. The data transfer control unit 30a stores the print image data in the memory 31a, according to the address information added to the print image data.

In step S154, the data transfer control unit 30a determines whether transmission of the print image data of the color Y from the upper level device 10 ends. For example, the data transfer control unit 30a determines whether the transmission of the print image data ends, on the basis of the size information added to the print image data transmitted by the upper level device 10. The upper level device 10 may transmit instruction information to the data transfer control unit 30a, when the transmission of the print image data ends. When it is determined that the transmission of the print image data does not end, the upper level device 10 makes the process return to step S161 and continuously receives the data and stores the data in the memory 31a.

Meanwhile, when it is determined that the transmission of the print image data ends, the upper level device 10 makes the process proceed to step S155 and transmits the data end notification to the printer controller 14 through the engine I/F control line 40a. Then, the process is returned to step S150.

As such, without transmitting the data transfer request from the data transfer control units 30a to 30d to the upper level device 10, after responding to the data request from the printer controller 14, the upper level device 10 may directly transfer the print image data of the individual colors to the data transfer control units 30a to 30d through the data lines 11a to 11d.

<First Embodiment>

Next, the first embodiment of the present invention will be described. In the first embodiment, the memories 31a to 31d that are included in the data transfer control units 30a to 30d are collectively managed by the printer controller 14. Hereinafter, the case where the print image data is supplied from the upper level device 10 to the printer device 13 by bitmap data having the same size in each of the colors C, M, Y, and K will be described.

Figure 12:
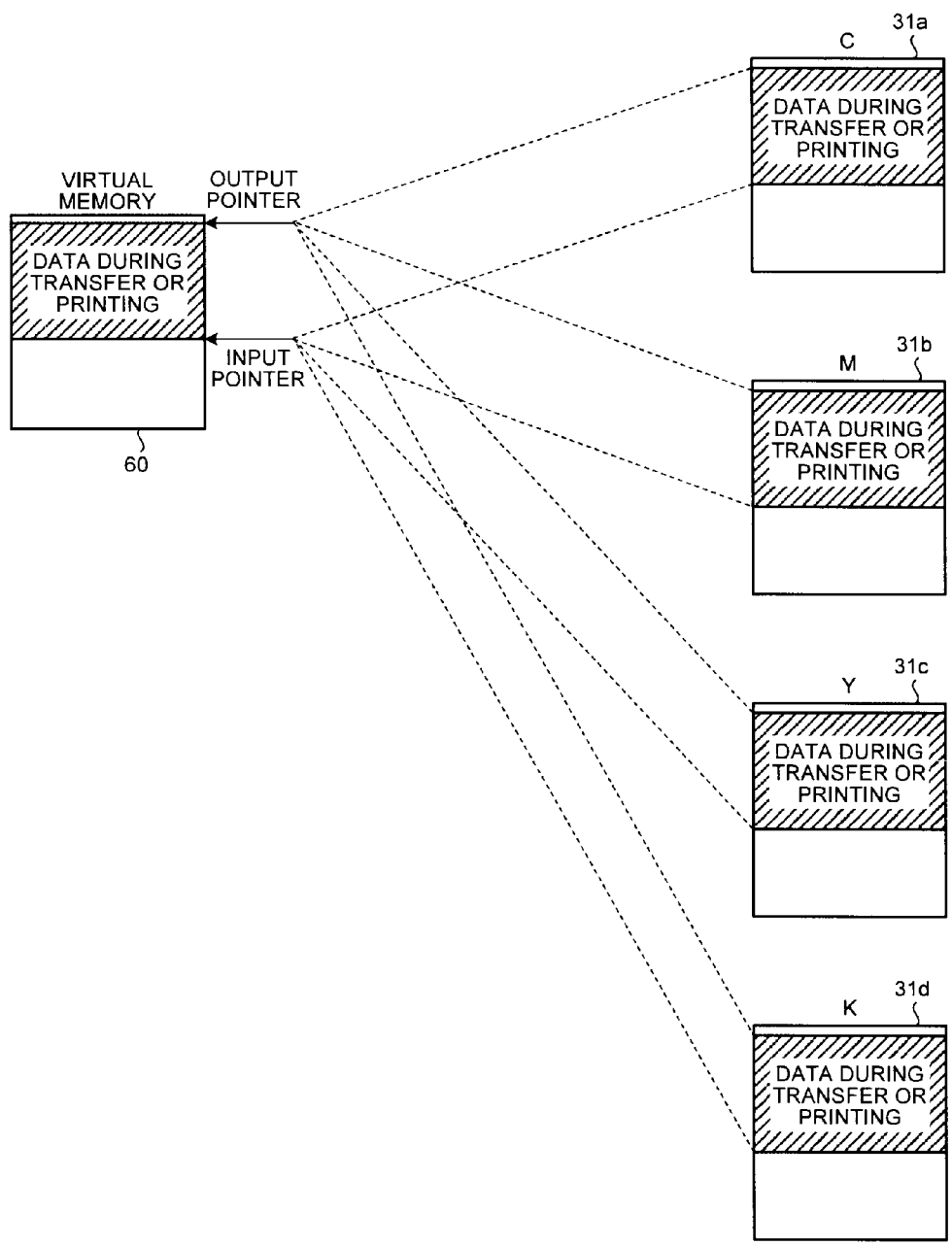
FIG. 12 is a schematic diagram illustrating a virtual memory according to each embodiment of the present invention.

In the first embodiment, in the printer controller 14, a virtual memory 60 that has the same memory space as that of each of the memories 31a to 31d is defined (hereinafter, referred to as virtual memory 60), as illustrated in FIG. 12. The printer controller 14 manages a start point of writing the print image data transferred from the upper level device 10 into respective memories 31a to 31d (referred to as "input pointer") and a start point of reading the print image data from respective memories 31a to 31d (referred to as "output pointer") respectively on the virtual memory 60.

When the printer controller 14 performs the writing with respect to respective memories 31a to 31d, the controller 14 sends the address indicated by the input pointer to respective data transfer control units 30a to 30d. The respective data transfer control units 30a to 30d start to write the data using the address indicated by the input pointer sent from the printer controller 14 as the head address. Similarly, when the printer controller 14 performs the reading from respective memories 31a to 31d, the controller 14 sends the address indicated by the output pointer to respective data transfer control units 31a to 30d. The respective data transfer control units 31a to 30d start to read the data from respective memories 31a to 31d using the address indicated by the output pointer sent from the printer controller 14.

The printer controller 14 updates the input pointer by moving the address by one page when the writing of the data corresponding to one page is completed. Similarly, the printer controller 14 updates the output pointer by moving the address by one page when the reading of the data corresponding to one page is completed. Since the start point of writing and the start point of reading as for respective memories 31a to 31d are collectively managed by the printer controller 14, storage areas in respective memories 31a to 31d can be easily reserved and released page by page.

Figures 13A, 13B:
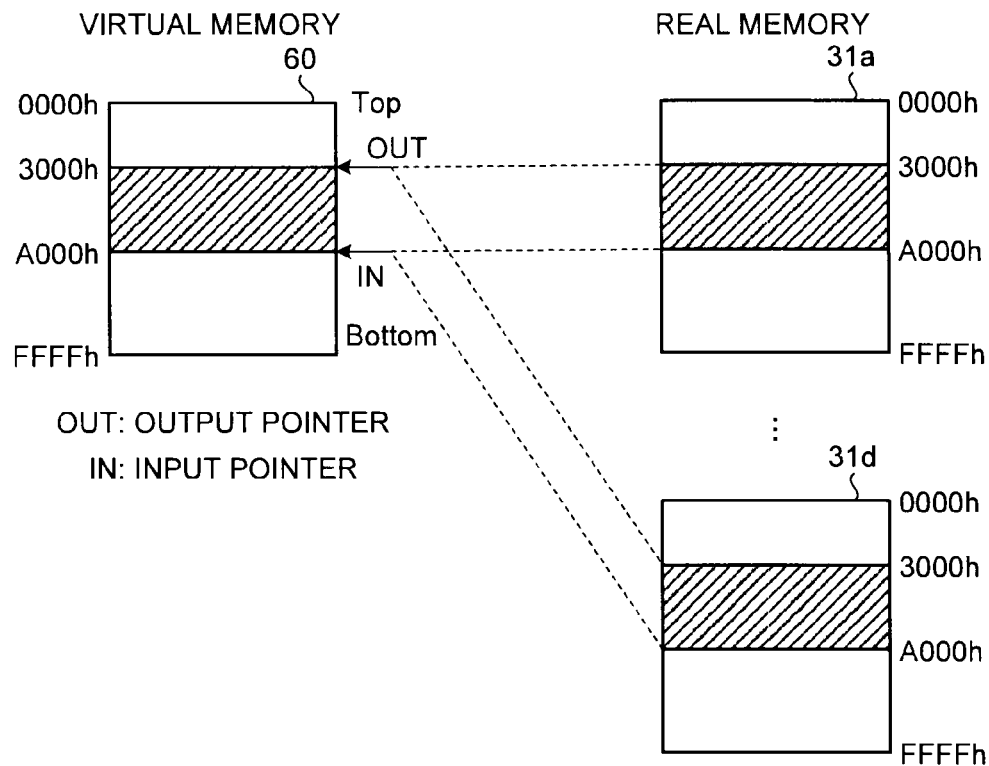
FIGS. 13A and 13B are schematic diagrams illustrating a specific example of the virtual memory.

For example, the virtual memory 60 is configured as an address map that is information indicating memory spaces in respective memories 31a to 31d. FIGS. 13A and 13B illustrate a further specific example of the virtual memory 60. For example, as illustrated in FIG. 13A, in respective memories 31a to 31d which are real memories, each top address indicating each start point of available area is defined as "0000h" and each bottom address indicating each end point of available area is defined as "FFFFh". The address in respective memories 31a to 31d is increased by a predetermined unit in a direction from the top address to the bottom address. Incidentally, the denotation "h" means that a character string immediately before "h" in the address is a numeral in hexadecimal.

The top address and the bottom address of the virtual memory 60 are defined as "0000h" and "FFFFh", respectively, similarly to respective memories 31a to 31d. Furthermore, input pointers (IN) and output pointers (OUT) of respective memories 31a to 31d which are real memories are managed as the same addresses as the input pointer and the output pointer of the virtual memory 60. In the example of FIG. 13A, the output pointer is identified by the address "3000h" and the input pointer is identified by the address "A000h".

FIG. 13B illustrates an example of address map 60a which is to be an entity of the virtual memory 60. For example, the address map 60a is configured as an assembly of addresses that include a Top address, a Bottom address, and addresses of an output pointer and an input pointer at a current point of time. In the example of FIG. 13B, a write address (write) to write data is further included in the address map 60a.

In the addresses of the input pointer and the output pointer, an address corresponding to one page is increased and updated, when writing of one page ends and reading of one page ends. When data is written with respect to each of the memories 30a to 30d, the write address is increased in a data write unit and a write position of data with respect to each of the memories 30a to 30d is shown. As the update result of the input pointer, the output pointer, and the write address, when the resulted value is more than the Bottom address, the address is set cyclically from the Top address.

The address map 60a is constructed in the control unit 23 in the printer controller 14, for example. Specifically, the address map 60a is constructed by storing each value on the RAM 323 by the CPU 321, for example. The Top address and the Bottom address can be previously stored in the ROM 324. At the time of starting and an initialization process of the printer device 13, the control unit 23 communicates with each of the data transfer control units 30a to 30d through the control signal transmitting/receiving unit 21, acquires the Top address and the Bottom address of each of the memories 31a to 31d, and generates the address map 60a. However, the invention is not limited thereto and a memory space may be actually secured on the RAM 323 of the printer controller 14 and the virtual memory 60 may be constructed.

Figure 14A:
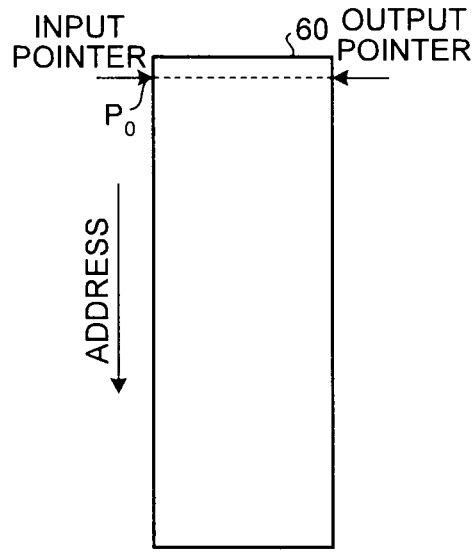
FIGS. 14A to 14D are schematic diagrams illustrating control of an input pointer and an output pointer on the virtual memory.
Figure 14B:
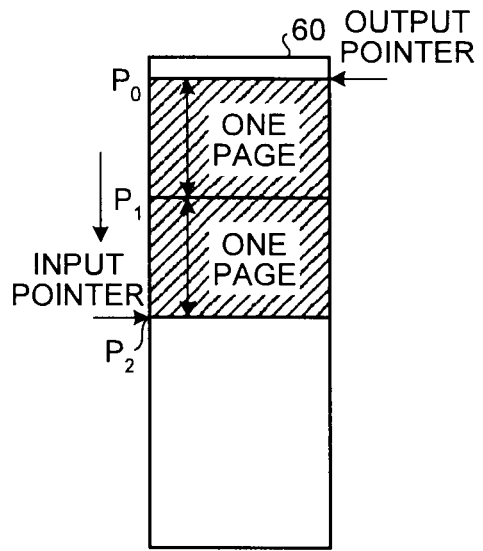

Referring to FIGS. 14A to 14D, control of the input pointer and the output pointer on the virtual memory 60 will be described. In FIGS. 14A to 14D, an address increases from the upper side to the lower side. As illustrated in FIG. 14A, in the virtual memory 60, in an initial state, the input pointer and the output pointer show an address $P_0$.

For example, in SEQ101 of FIG. 8, once the upper level device 10 requests the data transfer of the first page to the printer controller 14, the print image data corresponding to the first page starts to be written into respective memories 31a to 31d from the address P0 indicated by the input pointer on the virtual memory 60. If it is judged that the transfer of the print image data for all colors corresponding to the first page is completed, the printer controller 14 moves the input pointer on the virtual memory 60 by an amount of one page from the address P0 to the address P1 so that the input pointer is updated as the address P1. Thereby, the new address is designated to which the print image data corresponding to the next page is to be transferred. In the example of FIG. 8, if the completion of transferring the print image data of color K corresponding to the first page is notified to the print controller 14 at SEQ111d, the printer controller 14 judges that transferring the print image data for all colors corresponding to the first page is completed.

Incidentally, in this example, the explanation was made on the case that the input pointer is updated, when the transfer of the print image data for all color corresponding to the first page is completed. However, the present invention is not limited to this example. For example, the input pointer may be updated, every time when the data transfer of the print image data for one color corresponding to the first page is completed.

The print image data corresponding to the second page is written into respective memories 31a to 31d from the address $P_1$ (that is the transfer destination address) indicated by the input pointer on the virtual memory 60. For example, if the data transfer of the print image data for all colors corresponding to the second page is completed and the data transfer of the print image data corresponding to the next page is requested at SEQ115 in FIG. 8, the printer controller 14 moves the input pointer by an amount of one page from the address $P_1$ to the address $P_2$ so that the input pointer is updated as the address $P_2$. Thereby, the new address is designated to which the print image data corresponding to the next page is to be transferred (see FIG. 14B).

Figure 14C:
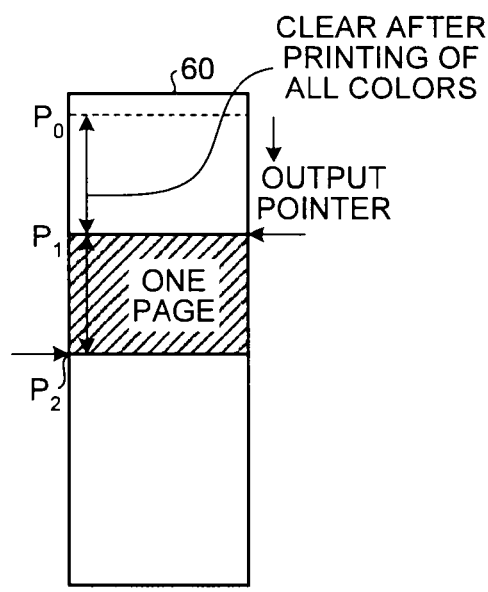
Figure 14D:
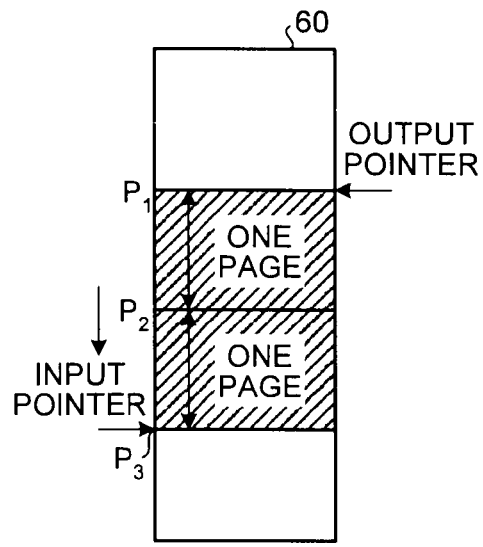

Once the printing operation for all colors corresponding to the first page is completed, the printer controller 14 moves the output pointer by an amount of one page from the address P0 to the address P1 so that the output pointer is updated as the address P1. Thereby, the print start position of the next page is designated to the top address of the second page, as illustrated in FIG. 14C. In the example of FIG. 8, if the printing operation for color K corresponding to the first page is completed at SEQ120d, the printer controller 14 judges that the printing operation for all colors corresponding to the first page is completed.

Incidentally, in this example, the explanation was made on the case that the output pointer is updated, when the printing operation for all colors corresponding to the first page is completed. However, the present invention is not limited to this example. For example, the output pointer may be updated, every time when the printing operation for one color corresponding to the first page is completed.

Once the printing operation for all colors corresponding to one page is completed, the printer controller 14 sends an instruction to respective data transfer control units 30a to 30d for clearing (so-called "zero-clear") the areas of respective memories 31a to 31d where the print image data is already written by the completed printing operation, as well as moving the output pointer. In accordance with this instruction, respective data transfer control units 30a to 30d perform the "zero-clear" by filling the areas of respective memories 31a to 31d where the printing operation is already completed (e.g. an area designated by addresses $P_o$ to $P_1$ on the virtual memory 60 for the first page) with zero. Thus, by filling the areas of respective memories 31a to 31d where the printing operation is completed with zero, any mistake can be avoided in the following printing operation.

In the above description, the areas where the print image data is already written by the completed printing operation is explained as the areas of respective memories 31a to 31d to which the "zero-clear" is performed. However, the present invention is not limited to this. For example, the areas of respective memories 31a to 31d to which the "zero-clear" is performed may be set to the discharge ended areas where the print image data is written. In this case, the data before discharged is stored into respective memories 31a to 31d of respective data transfer control units 30a to 30d. Therefore, it becomes not necessary to re-transfer the print image data from the upper level device 10, even in a case that the re-printing of page is needed because of a jam trouble of the printing sheet 201.

In the above description, the "zero-clear" of respective memories 31a to 31d is performed at a time point when the print operation corresponding to one page is completed. However, the present invention is not limited to this. That is, the "zero-clear" of respective memories 31a to 31d may be performed at any time point from the time point when the print image data corresponding to a page before printing is transferred from the upper level device 10 until the time point when the transferred print image data is written into respective memories 31a to 31d. In this case, the output pointer may be moved in advance at the time point when the printing operation corresponding to one page is completed, or may be moved at the time point when the "zero-clear" is performed. Furthermore, the "zero-clear" may be performed almost simultaneously at respective memories 31a to 31d, or may be performed sequentially from the memory among memories 31a to 31d to which the print image data is transferred.

Then, the data transfer corresponding to the second page is completed, the printer controller 14 moves the input pointer on the virtual memory 60 by an amount of one page from the address $P_2$ to address $P_3$ so that the input pointer is updated as the address $P_3$. Thereby, the new address is designated to which the data corresponding to the third page is transferred.

Thus, in the present embodiment, the input pointer that indicates the transfer destination address of the print image data is moved on the virtual memory 60, upon the completion of the data transfer corresponding to one page. And, the output pointer that indicates the reading start position address of the print image data is moved on the virtual memory 60, upon the completion of the printing operation for each color corresponding to one page. Furthermore, the writing and the reading of the print image data with respective to respective memories 31a to 31d is performed in accordance with the addresses indicated by the input pointer and the output pointer on the virtual memory 60. Thereby, the printer controller 14 can readily manage statuses of respective memories 31a to 31d. Along with that, the printer controller 14 can readily judge whether the printing operation for all colors is completed, in the printing operation corresponding to one page.

Incidentally, the writing and reading of the image print data corresponding to one page is not always performed at the same timing or the same speed. Specifically, in the necessity of performing the high speed printing, the print image data is often buffered to ensure the continuous printing. For this purpose, it is preferable to control the access of the print image data to respective memories 31a to 31d in such a manner that the writing speed becomes faster than the reading speed. In this case, the print image data corresponding to more than one page is stored into respective memories 31a to 31d. Thereby, the difference in address between the input pointer and the output pointer corresponds to a page size corresponding to more than one page.

Furthermore, the difference in address between the input pointer and the output pointer is affected by the development speed (RIP processing speed) of the print image data at the upper level device 10. Specifically, since the development speed of the print image data depends on the content of the print image data, the change speed of the input pointer depends on the content of the print image data. On the other hand, since the change speed of the output pointer depends on the printing speed at the image output unit 50 (data output speed to respective heads 56a to 56d), it becomes constant. Incidentally, in a case that the writing speed of the print image data into respective memories 30a to 30d is slower than the reading speed at the image output unit 50, the difference in address between the input pointer and the output pointer becomes zero.

<Transfer Management Table>

Next, the transfer management table according to the first embodiment will be described. The transfer management table is used to manage a data transfer process in the data transfer control units 30a to 30d or a printing process in the image output unit 50. In the printer controller 14, the control unit 23 generates and holds the transfer management table, on the basis of a print job transmitted from the upper level device 10, the paper information, and the information indicating the (3) printing conditions described using FIG. 7. Specifically, the CPU 321 generates the transfer management table and stores the transfer management table in the RAM 323.

When the control unit 23 outputs the data transfer start request or the printing instruction to the data transfer control units 30a to 30d, the control unit 23 holds needed information among the information of the transfer management table in the data transfer control units 30a to 30d. For example, the control unit 23 transmits the information from the control signal transmitting/receiving unit 21 to the data transfer control units 30a to 30d through the engine I/F control lines 40a to 40d, and the information is written in the storage unit of the data transfer control units 30a to 30d, such as registers.

A specific example will be described using the data transfer control unit 30a. The control unit 23 transmits needed information among the information of the transfer management table from the control signal transmitting/receiving unit 21 to the data transfer control unit 30a through the engine I/F control line 40a, and the information is written in a register of a logic circuit 32a (data transfer control unit controller 135a) in the data transfer control unit 30a.

The data transfer control units 30a to 30d output the transmission request of the print image data to the upper level device 10 or the printing instruction to the image output unit 50, according to the information of the transfer management table written in the registers. A page identifier to identify a page is included in the transfer management table, and the data transfer control units 30a to 30d select the information of the transfer management table on the basis of the page identifier and execute the data transfer and the printing process.

FIG. 15 illustrates an example of the transfer management table that is applied to the first embodiment. The transfer management table includes information that is common to the colors C, M, Y, and K and information for each color. The information common to each color and the information for each color include data transfer information that is used to transmit the print image data from the upper level device 10 and print information that is information related to the printing instruction with respect to the image output unit 50. A management form of each information that is included in the transfer management table is not limited to a table form and each information may be managed in another data management form.

The information that is common to each color in the first embodiment will be described. In the information that is common to each color, a page identifier PBID and a data amount for each page are included as information other than the data transfer information and the print information. The page identifier PBID is a page identifier to identify a printing page and the transfer management table is identified by the page identifier PBID. The data amount for each page is the number of colors that are used in the page identified by the page identifier PBID, and for example, in the case of a monochrome, a value becomes "1" and in the case of a full color, a value becomes "4".

The data transfer information in the information common to each color that is applied to the first embodiment includes a data transfer origin address, a data storage destination address, and a data transfer size. The data transfer origin address indicates an address where the print image data of the page indicated by the page identifier PBID in the upper level device 10 is stored. The data transfer origin address designates the print image data in a raster (line) unit.

In the first embodiment, the same address is used as the transmission origin address, with respect to the print image data of each color. For example, in the upper level device 10, the print image data of each color is stored in the storage unit 122 illustrated in FIG. 2B. Specifically, with respect to the RAM 103 shown in FIG. 2A, the print image data of each color is stored in the address that is identified by each of the data lines 11*a* to 11*d* or each color.

The data storage destination address is an address that is indicated by the input pointer. Therefore, the data storage destination address is also updated whenever the input pointer is updated. The data transfer size indicates a data size of the print image data that is transmitted according to a request from each of the data transfer control units 30*a* to 30*d*. For example, the data transfer size is a data size of the print image data of the page that is indicated by the page identifier PBID.

The data transfer size includes a boundary adjustment size to adjust the size of the print image data in a predetermined unit (for example, byte unit). When one page is printed, the print image data of the data size that is indicated by the data transfer size is stored in each of the memories 31*a* to 31*d*. For example, a value that is obtained by adding the boundary adjustment size to a "print data size" of the information indicated by the (3) printing conditions described using FIG. 7 becomes the data transfer size.

The print information in the information common to each color that is applied to the first embodiment will be described. The print information includes resolution and gradation as information of print image data to be printed and includes a paper feeding length, a paper width, a printing surface (surface/back surface), a printing prohibited area (upper side/lower side/left side/right side), and image information as information related to a printing object. The image information includes a bitmap printing position X and a bitmap printing position Y and an X direction effective size and a Y direction effective size.

In the information of the print image data to be printed, the resolution indicates printing resolution of each of a main scanning direction and a sub-scanning direction. The gradation indicates the number of bits per pixel.

Figure 16A:
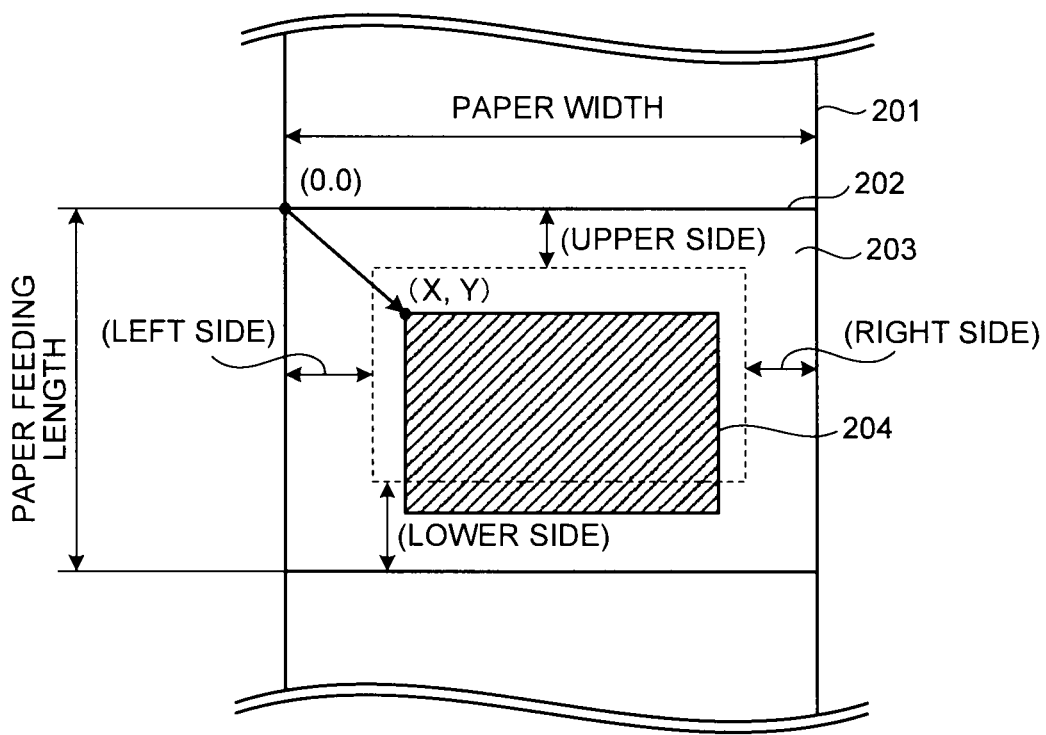
FIGS. 16A and 16B are schematic diagrams illustrating information related to a printing object.
Figure 16B:
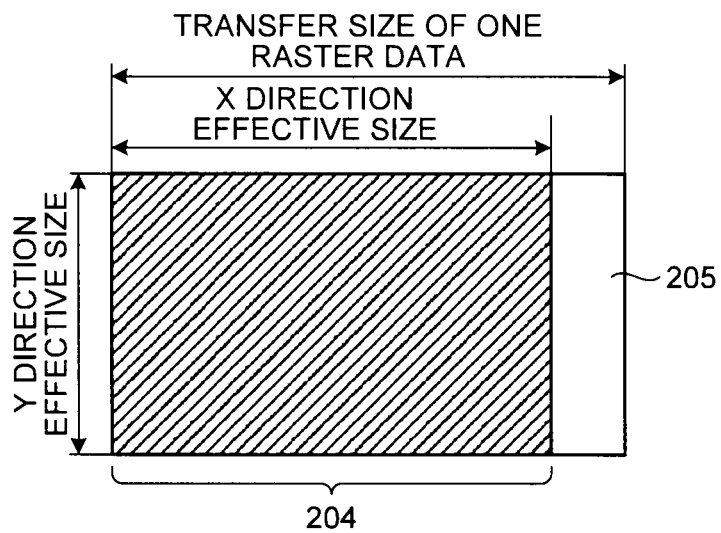

The information related to the printing object will be described using FIGS. 16A and 16B. FIG. 16A illustrates an example of a page area 202 with respect to printing paper 201. FIG. 16B illustrates an example of an effective printing area 204 by print image data. In the paper feeding length, the length of one page in a feeding direction of the printing paper 201 is represented by the number of dots and in the paper width, the length of the printing paper 201 in a width direction is represented by the number of dots. The printing surface indicates whether the print image data of the corresponding page is printed on the surface of the printing paper 201 or is printed on the back surface thereof.

The upper, lower, left, and right sides in the printing prohibited area are to represent a printing prohibited area 203 where printing is prohibited by the number of dots from an upper end (head of the paper feeding direction), a lower end (rear end of the paper feeding direction), a left end (left end of the paper width direction toward the paper feeding direction), and a right end (rear end of the paper width direction toward the paper feeding direction) of the page area 202.

The bitmap printing positions X and Y of the image information are to represent an address (coordinates) of the printing start position by the number of dots, when the upper left (head of the paper feeding direction and left end of the paper width direction) of the page area 202 is set to an original point. The X direction effective size in the image information is to represent a size not including a boundary adjustment area 205 of an X direction (paper width direction) by the number of dots. The boundary adjustment area 205 is provided to adjust a data size in a predetermined unit, when a data size of one raster data includes fractions of a predetermined unit or less (for example, byte unit). The Y direction effective size is to represent a size of a Y direction (paper feeding direction) by the number of dots. That is, the X direction effective size indicates an effective size that is printed by one raster data and the Y direction effective size indicate the number of rasters (number of lines) printed with the X direction effective size.

That is, the bitmap printing positions X and Y are set to the upper left and the area that are shown by the X direction effective size and the Y direction effective size becomes the printing area 204. In an area of the printing area 204 that overlaps the printing prohibited area 203, printing is not performed.

Information of each color according to the first embodiment will be described. The information of each color includes a Color identifier that indicates the printing color where information is described among the colors C, M, Y, and K, as information other than the data transfer information and the print information. Since the information of each color has the common configuration, information where the Color identifier is "Cyan" is described hereinafter. In the information management table, the information of each color is included with respect to each of the colors C, M, Y, and K.

The data transfer information in the information of each color that is applied to the first embodiment includes information that indicates whether transmission of data is needed. The information that indicates whether the transmission of the data is needed indicates whether transmission of print image data of the corresponding printing color is needed. For example, in the case of white paper, that is, in the case of not performing printing, the information that indicates whether the transmission of the data is needed is set to "non-necessity", with respect of all of the colors C, M, Y, and K. With respect to colors other than the colors designated by the Colors (Cyan, Magenta, Yellow, and Black) identifiers, the information that indicates whether the transmission of the data is needed is set to "non-necessity".

The print information in the information of each color that is applied to the first embodiment includes information that indicates whether printing is needed. The information that indicates whether the printing is needed indicates whether printing of print image data of the corresponding printing color is needed. For example, in the case of white paper, that is, in the case of not performing printing, the information that indicates whether the printing is needed is set to "non-necessity", with respect of all of the colors C, M, Y, and K. With respect to colors other than the colors designated by the Colors, the information that indicates whether the transmission of the data is needed is set to "non-necessity".

<Memory Control Process>

Figure 17:
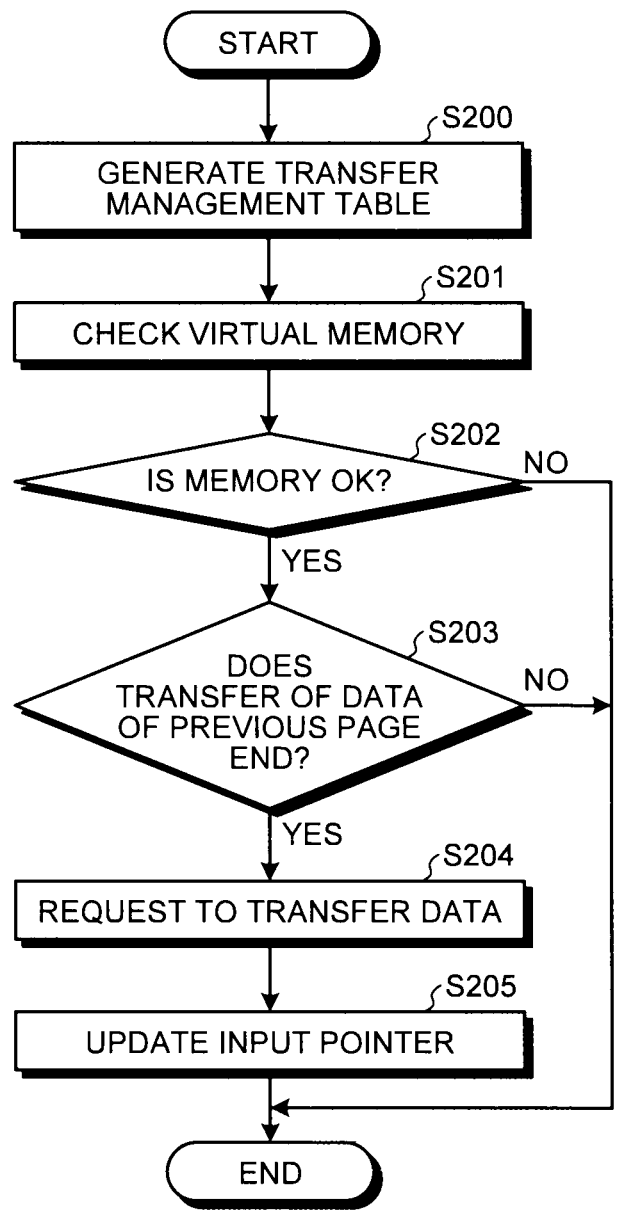
FIG. 17 is a flowchart illustrating an example of a process when the printer controller receives data from the upper level device.

Next, a control process of the memories 31a to 31d according to the first embodiment will be described using FIGS. 17 to 21. FIG. 17 illustrates an example of a process of when the printer controller 14 receives data from the upper level device 10. The process according to the flowchart of FIG. 17 starts when the print job of the page is received from the upper level device 10 by the control unit 23, in the printer controller 14, in SEQ101 or SEQ102 of FIG. 8. Each process according to the flowchart of FIG. 17 is executed by control from the control unit 23 in the printer controller 14.

The printer controller 14 generates the transfer management table, on the basis of the received print job, the paper information received from the upper level device 10 in SEQ100 of FIG. 8, and the information indicating the (3) printing conditions described using FIG. 7, when the print job is received from the upper level device 10 (step S200). In step S201 of FIG. 17, the printer controller 14 checks the virtual memory 60 and acquires the empty capacities of the memories 31a to 31d.

Figure 18:
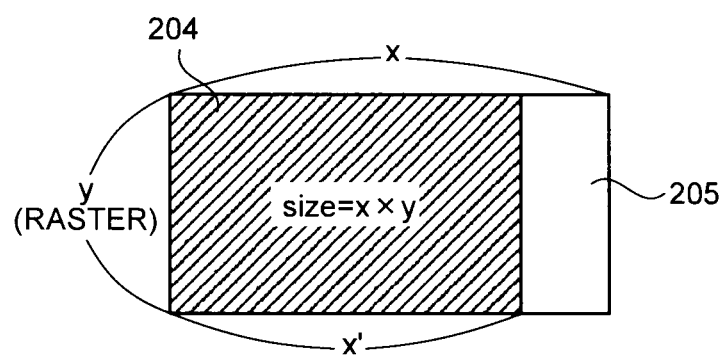
FIG. 18 is a schematic diagram illustrating a check of an empty memory capacity in the virtual memory.

The checking of the empty capacities of the memories 31a to 31d by the virtual memory 60 will be described using FIGS. 18 and 19D. Hereinafter, the "empty capacity of each of the memories 31a to 31d by the virtual memory 60" is described as the "empty capacity on the virtual memory 60" or is simply described as the "empty capacity". The data size of the print image data corresponding to one page transmitted from the upper level device 10 is a data size that is obtained by adding the data size of the printing area 204 and the data size of the boundary adjustment area 205, as illustrated in FIG. 18.

Meanwhile, the empty capacity on the virtual memory 60 can be calculated on the basis of the difference of an address $P_i$ indicating an input pointer and an address $P_o$ indicating an output pointer. A method of calculating the empty capacity on the virtual memory 60 will be schematically described using FIGS. 19A to 19D. In FIGS. 19A to 19D, the address of the virtual memory 60 increases from the upper side to the lower side and an area where print image data is written is shown by adding oblique lines.

Figure 19A:
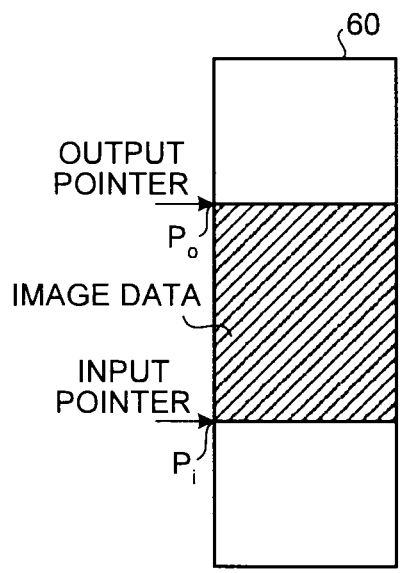
FIGS. 19A to 19D are schematic diagrams illustrating a check of an empty memory capacity in the virtual memory.
Figure 19B:
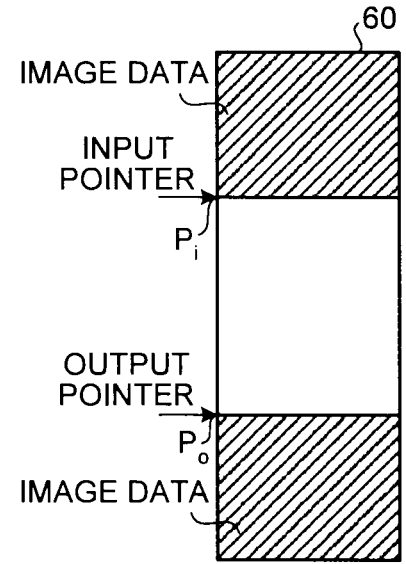
Figure 19C:
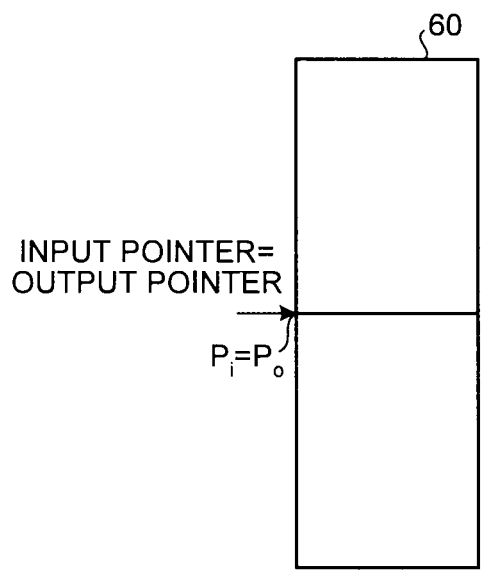
Figure 19D:
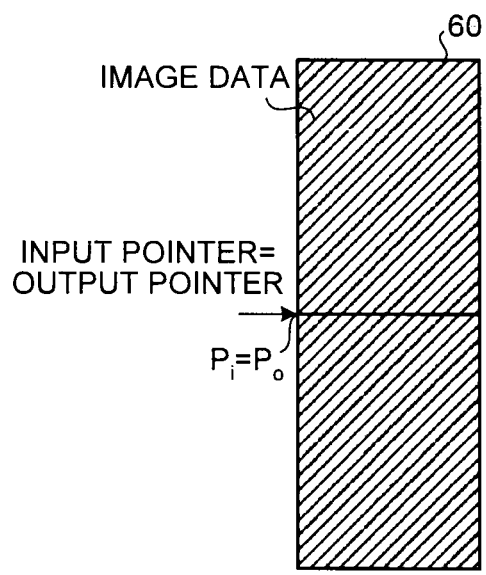

In this case, according to a relation between the input pointer and the output pointer on the virtual memory 60, there are three cases, (A) the case where the address $P_i$ of the input pointer is more than the address $P_o$ of the output pointer (refer to FIG. 19A), (B) the case where the address $P_o$ of the output pointer is more than the address $P_i$ of the input pointer (refer to FIG. 19B), and (C) the case where the address $P_i$ of the input pointer is equal to the address $P_o$ of the output pointer (refer to FIGS. 19C and 19D). The empty capacity $D_{EMP}$ on the virtual memory 60 can be obtained on the basis of the difference of the address $P_i$ of the input pointer and the address $P_o$ of the output pointer.

The case (A) where the address $P_i$ of the input pointer is more than the address $P_o$ of the output pointer ($P_i$>$P_o$) indicates that print image data is stored in an area from the address $P_o$ of the output pointer to the address $P_i$ of the input pointer, as illustrated in FIG. 19A. In this case, when a data size for each address is W and the capacity of the virtual memory 60 is $D_{FULL}$, the empty capacity $D_{EMP}$ is calculated by the following equation (1).

$$D_{EMP}=D_{FULL}-(P_i-P_o)\times W \quad (1)$$

The case (B) where the address $P_o$ of the output pointer is more than the address $P_i$ of the input pointer ($P_o$>$P_i$) indicates that print image data is stored in an area from the address $P_o$ of the output pointer to the Bottom address of the virtual memory 60 and an area from the Top address of the virtual memory 60 to the address $P_i$ of the input pointer, as illustrated in FIG. 19B. In this case, the empty capacity $D_{EMP}$ is calculated by the following equation (2). In the case of (B), the Top address and the Bottom address are connected and read is controlled in a ring buffer manner.

$$D_{EMP}=(P_o-P_i)\times W \quad (2)$$

The case (C) where the address $P_i$ of the input pointer is equal to the address $P_o$ of the output pointer ($P_i$=$P_o$) indicates that the virtual memory 60 is empty (refer to FIG. 19C) and that print image data is stored in the virtual memory 60 without the empty capacity (refer to FIG. 19D). It can be determined whether the virtual memory 60 is empty or full, on the basis of whether printing ends or starts. However, the present invention is not limited thereto and the printer controller 14 may monitor movement of the input pointer and the output pointer on the virtual memory 60 and set a flag when the virtual memory is full.

Returning the description to the flowchart of FIG. 17, if the empty capacity of the virtual memory 60 is calculated in step S201, the printer controller 14 determines whether print image data (in this case, print image data of one color) corresponding to one page can be stored with respect to the calculated empty capacity of the virtual memory 60, on the basis of the data transfer size of the transfer management table, in next step S202. When it is determined that the print image data cannot be stored, the process of the flowchart of FIG. 17 is not performed. In this case, when it is determined that printing ends, the printer controller 14 can request to transmit print image data.

Meanwhile, when it is determined that the print image data corresponding to one page can be stored in step S202, the printer controller 14 makes the process proceed to step S203 and determines whether transmission of print image data of the previous page ends. When it is determined that the transmission of the print image data does not end, the process of the flowchart of FIG. 17 is not performed. In this case, when it is determined that the transmission of the print image data ends, the printer controller 14 may request to transmit print image data of a next page. Meanwhile, when it is determined that the transmission of the print image data ends, the process proceeds to step S204.

In step S204, the printer controller 14 requests each of the data transfer control units 30a to 30d to start to transmit the print image data of each color indicated by the page identifier PBID in the transfer management table. For example, this corresponds to the processes of SEQ110a to SEQ110D in the sequence of FIG. 8 and SEQ208, SEQ212, SEQ216, and SEQ220 in the sequence of FIG. 10A, when the page identifier PBID indicates the first page. Then, the process proceeds to step S205 and the printer controller 14 moves the position of the input pointer on the virtual memory 60 by one page and updates the input pointer. If the input pointer is updated, the process exits the flowchart of FIG. 17.

In step S204, once the printer controller 14 requests to start the data transfer of the print image data to respective data transfer control units 30a to 30d, the requests of transferring the print image data are sent from respective data transfer control units 30a to 30d to the upper level device 10. For example, in a case that the page identifier PBID indicates the first page, this corresponds to SEQ209A, SEQ213A, SEQ217A, and SEQ221A in the sequence of FIG. 10A.

At this time, each of the data transfer control units 30a to 30d adds at least the page identifier PBID and the data transfer origin address shown in the transfer management table of FIG. 15 to the data transfer start request and transmits the data transfer request to the upper level device 10. The page identifier PBID and the data transfer origin address are extracted from the transfer management table in the printer controller 14 and are transmitted to each of the data transfer control units 30a to 30d, in step S126 of FIG. 9B, as described above.

The upper level device 10 reads the print image data of each color from the storage unit 122, on the basis of the page identifier PBID and the data transfer origin address transmitted from each of the data transfer control units 30a to 30d, and transmits the print image data to each of the data transfer control units 30a to 30d through each of the data lines 11a to 11d. In this case, the page identifier PBID and the data transfer origin address are added to the transmission start request of the print image data by the printer controller 14 and are transmitted to each of the data transfer control units 30a to 30d.

FIG. 20 is a flowchart illustrating an example of a process of when transmission ends. The process according to the flowchart of FIG. 20 starts when the notification of the end of the transmission of the data is received from the data transfer control units 30a to 30d and is executed by the printer controller 14, in SEQ111a to SEQ111d of FIG. 8.

First, in step S210, it is determined whether transmission of the print image data corresponding to one page with respect to each of the four colors, that is, each of the colors C, M, Y, and K from the upper level device 10 to each of the data transfer control units 30a to 30d ends. For example, the printer controller 14 sets the flags, whenever the notification of the end of the transmission of the print image data is received from the each of the data transfer control units 30a to 30d, in SEQ111a to SEQ111d of FIG. 8. If the flags of the four colors are set, the printer controller 14 determines that the transmission of the print image data of each color corresponding to one page ends. When it is determined that the transmission of the print image data does not end, the process proceeds to step S213.

Meanwhile, when it is determined that the transmission of the print image data of each color corresponding to one page ends, the printer controller 14 makes the process proceed to step S211 and determines whether the print image data is being printed. For example, after the printing instruction is output to each of the data transfer control units 30a to 30d in SEQ114 of FIG. 8, if the corresponding printing instruction end notification is not received in SEQ120a to SEQ120d, the printer controller 14 determines that printing is being performed. When it is determined that printing is being performed, the process proceeds to step S213. Meanwhile, when it is determined that printing is not performed at the present time, the printer controller 14 makes the process proceed to step S212 and outputs the printing instruction of the page indicated by the page identifier PBID to each of the data transfer control units 30a to 30d (for example, SEQ114 of FIG. 8).

Next, in step S213, the printer controller 14 determines whether there is next print image data transmitted from the upper level device 10 to each of the data transfer control units 30a to 30d. For example, when the print image data where the printing instruction is output in step S212 is the print image data of the first page and the process proceeds to step S213, if the print job of the next second page is received by SEQ102 of FIG. 8, it is determined that print image data to be transmitted next exists.

Figure 21:
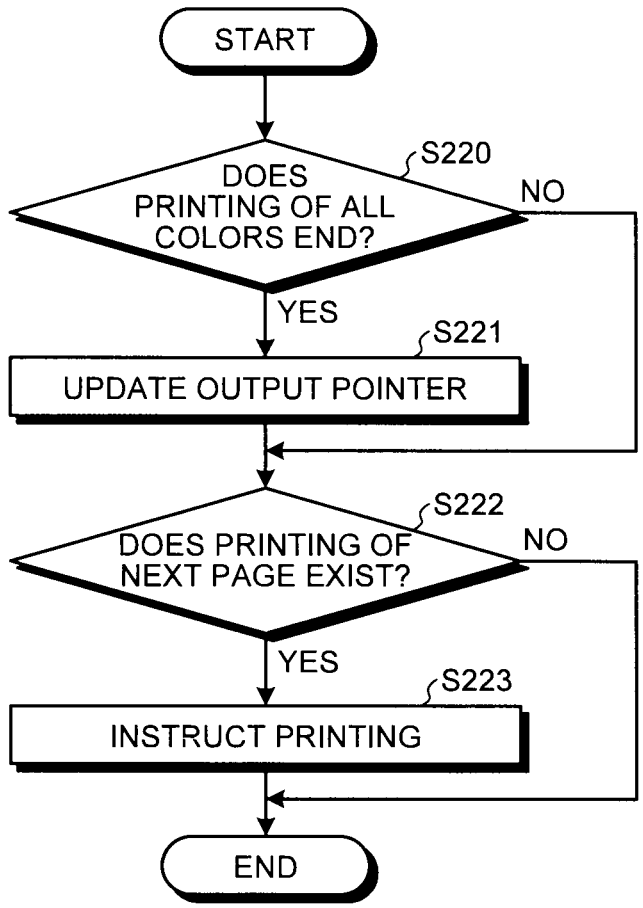
FIG. 21 is a flowchart illustrating an example of a process when printing ends.

If it is determined that the print image data to be transmitted next does not exist, the process exits the flowchart of FIG. 20. Meanwhile, if it is determined that the print image data to be transmitted next exist, the printer controller 14 makes the process proceed to step S214. The process of step S214 is the same as the process after step S201 in the flowchart illustrated in FIG. 17. After the empty state of the memory is confirmed, if the memory is empty, the printer controller 14 requests each of the data transfer control units 30a to 30d to start to transmit the next print image data and does not perform the process according to the flowchart of FIG. 20.p FIG. 21 is a flowchart illustrating an example of a process of when printing ends. The process according to the flowchart of FIG. 21 starts when the notification of the end of the printing is received from the data transfer control units 30a to 30d by the printer controller 14 and is executed by the printer controller 14, in SEQ120a to SEQ120d or SEQ122a to SEQ122d of FIG. 8.

First, in step S220, it is determined whether printing of all of the four colors ends, with respect to the print image data corresponding to one page. For example, the printer controller 14 sets the flags, whenever the notification of the end of the printing is received from the each of the data transfer control units 30a to 30d, in SEQ120a to SEQ120d of FIG. 8. If the flags of the four colors are set, the printer controller 14 determines that the printing of the print image data of each color corresponding to one page ends. However, the present invention is not limited thereto. When printing is performed in order of the colors C, M, Y, and K, the printer controller 14 may determine that printing ends, after the printing end notification of the final color K is received. When it is determined that printing of all of the four colors does not end, the process proceeds to step S222.

Meanwhile, when it is determined that printing of each color corresponding to one page ends, the process proceeds to step S221. In step S221, the printer controller 14 moves the position of the output pointer on the virtual memory 60 by one page and updates the output pointer. If the output pointer is updated, the process proceeds to step S222.

In step S222, the printer controller 14 determines whether a next page is printed. For example, the printer controller 14 receives the data transfer end notification from each of the data transfer control units 30a to 30d. However, when there is a page where the printing end notification is not received exists, the printer controller 14 can determine that printing of a next page exists. When it is determined that printing of the next page does not exist, the printer controller 14 does not perform the process according to the flowchart of FIG. 21. Meanwhile, when it is determined that printing of the next page exists, the printer controller 14 makes the process proceed to step S223, designates the page identifier PBID indicating the next page to each of the data transfer control units 30a to 30d, instructs each of the data transfer control units 30a to 30d to start to perform printing of the next page, and the process exits the flowchart of FIG. 21.

[Second Embodiment]

Next, the second embodiment will be described. The second embodiment is an example of the case where the memories 31a to 31d of the data transfer control units 30a to 30d are collectively managed by the printer controller 14 and print image data is transmitted from the upper level device 10 to the printer device 13, by bitmap data having a different size for each of the colors C, M, Y, and K. Hereinafter, a portion that is different from the first embodiment will be mainly described.

Figure 22A:
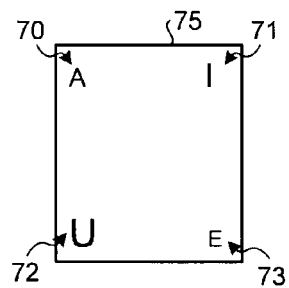
FIGS. 22A to 22C are schematic diagrams illustrating an example of the case where bitmap data having a size different for each color is transmitted.

An example of the case where the bitmap data having the different size for each of the colors is transmitted will be described using FIGS. 22A to 22C. For example, as illustrated in FIG. 22A, the case where an image 70 printed using the color C, an image 71 printed using the color M, an image 72 printed using the color Y, and an image 73 printed using the color K are disposed in a printing area 75 of one page is considered. The sizes of the images 70 to 73 are different from each other.

In this case, print image data of a minimum rectangular area including the image 70 is generated as the print image data of the color C at the side of the upper level device 10 and is transmitted to the data transfer control unit 30a. Similar to the color C, with respect to the other colors M, Y, and K, print image data of a minimum rectangular area including the images 71, 72, and 73 is generated at the side of the upper level device 10 and is transmitted to each of the data transfer control units 30b, 30c, and 30d. Thereby, the data transfer amount can be reduced, as compared with the case where print image data of one page is transmitted for each color.

In this case, a first method that performs arrangement of each print image data of the minimum rectangular area including the images 70 to 73 of the individual colors with respect to the predetermined position on the memories 31a to 31d and a second method that performs arrangement of each print image data to the predetermined position when printing is performed are used. Hereinafter, "each print image data of the minimum rectangular area including the images 70 to 73 of the individual colors" is described as "print image data of the images 70 to 73 of the individual colors".

Figure 22B:
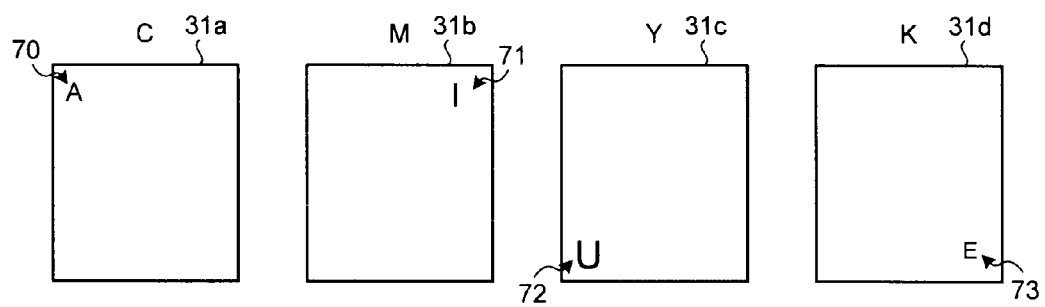

As illustrated in FIG. 22B, the first method writes the print image data of the images 70 to 73 in the addresses of the memories 31a to 31d corresponding to the printing positions of the images 70 to 73. In order to simplify the description, only a storage area of one page in the memories 31a to 31d is illustrated in FIG. 22B. According to the first method, since the area of one page is common in the memories 31a to 31d, the first virtual memory 60 that is common to the memories 31a to 31d may be prepared at the side of the printer controller 14.

In the first method, with respect to the transfer management table, address information of when the print image data of the images 70 to 73 is written in the memories 31a to 31d is described. As described above, in the memories 31a to 31d, an area where printing ends is cleared after printing of one page of each color ends and the output pointer is updated. For this reason, the data transfer control units 30a to 30d may overwrite the print image data of the images 70 to 73 with respect to the designated addresses of the memories 31a to 31d.

Figure 22C:
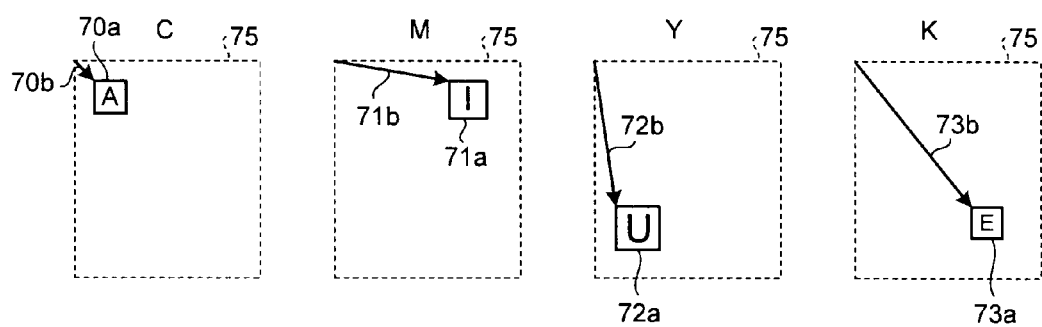

As illustrated in FIG. 22C, the second method writes the print image data of the images 70 to 73 in the memories 31a to 31d. In addition, the print image data of the images 70 to 73 that are read from the memories 31a to 31d are printed with respect to the predetermined arrangement positions of the images 70 to 73. According to the second method, the consumption amount per page in the memories 31a to 31d can be reduced.

Meanwhile, according to the second embodiment, since the sizes of the print image data of the images 70 to 73 may be different from each other, the printer controller 14 needs to prepare the virtual memory 60 with respect to each of the memories 31a to 31d. In this case, in the address map 60a that is illustrated in FIG. 13B, a group of an input pointer (IN), an output pointer (OUT), and a write address (write) is set to each of the memories 31a to 31d, like ($IN_a$, $OUT_a$, and $write_a$), ($IN_b$, $OUT_b$, and $write_b$), . . . . In addition, the transmission information and the print information of each color needs to be described with respect to the transfer management table.

The second method will be specifically described using FIG. 22C. For example, with respect to the image 70 of the color C, a print image data 70a of the minimum rectangular area that includes the image 70 is printed at the position indicated by a printing address 70b of the printing area 75. Likewise, with respect to the images 71, 72, and 73 of the colors M, Y, and K, print image data 71a, 72a, and 73a of the minimum rectangular area that includes the images 71, 72, and 73 are printed at the positions indicated by printing addresses 71b, 72b, and 73b of the printing area 75. Therefore, as information of the transfer management table, data sizes and information indicating the coordinates 70b to 73b need to be held, with respect to the print image data 70a to 73a.

FIG. 23 illustrates an example of the configuration of the transfer management table according to the second embodiment. Hereinafter, the redundant description of a portion that is common to the transfer management table according to the first embodiment illustrated in FIG. 15 will not be repeated.

The transfer management table according to the second embodiment includes information common to each color and information for each color, similar to the transfer management table according to the first embodiment. In this case, in the transfer management table according to the first embodiment and the transfer management table according to the second embodiment, the information common to each color and the information for each color are different from each other.

The information common to each embodiment according to the second embodiment will be described. As illustrated in FIG. 23, in the transfer management table according to the second embodiment, the information common to each color includes a page identifier PBID and a data amount for each page and includes resolution, gradation, a paper feeding length, a paper width, and a printing surface as print information. Since the sizes of the print image data of the individual colors to be transferred are different from each other, the information common to each color does not include data transfer information.

The information for each color according to the second embodiment will be described. In the information for each color, the Color identifier, the data transfer information, and the print information are included. The data transfer information in the information for each color that is applied to the second embodiment includes data transfer necessity, a transfer completion flag, a data transfer origin address, a data transfer destination address (data storage destination address), and a data transfer size. Among these, the transfer completion flag becomes ON when the printer controller 14 receives the notification informing that the data transfer of the print image data of the corresponding color is completed. The printer controller 14 can update the corresponding input pointer on the virtual memory 60, with respect to the color for which the data transfer completion flag becomes ON. The print information in the information for each color that is applied to the second embodiment includes print necessity, print prohibited areas (upper side/lower side/left side/right side), and image information. The print information includes the bitmap printing positions X and Y and a Y direction effective size and an X direction effective size.

In the second embodiment, the designation of the addresses to arrange the print image data of the images 70 to 73 on the memories 31a to 31d using the first method or the designation of the printing addresses of the print image data of the images 70 to 73 using the second method can be performed by the bitmap printing positions X and Y described as the print information for each color in the transfer management table.

Figure 24:
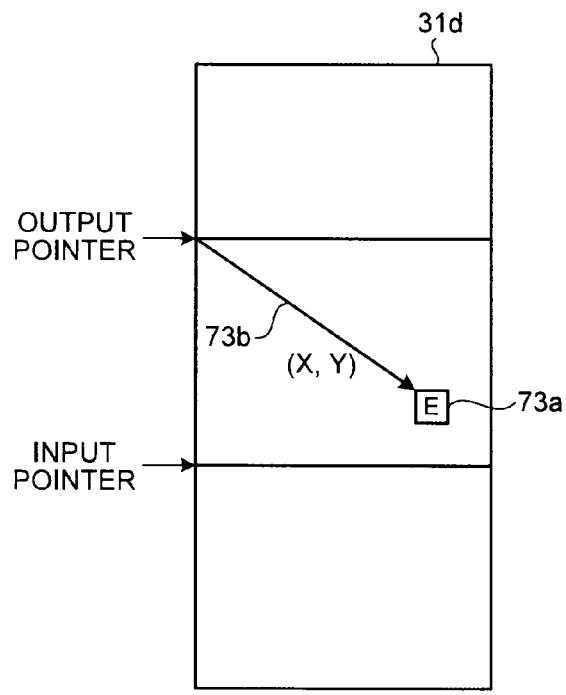
FIG. 24 is a schematic diagram illustrating an example of a method of arranging print image data on a memory using a first method.

An example of a method of arranging the print image data of the images 70 to 73 on the memories 31a to 31d using the first method will be described using FIG. 24. In this case, the image 73 in FIGS. 22A to 22C described above is used.

The image 73 is the image for the color K and the print image data 73a of the minimum rectangular area that includes the image 73 is written in the memory 31d in the data transfer control unit 30d. A head of an area of one page in the memory 31d is defined by the address indicated by the output pointer set to the virtual memory 60 common to each color in the printer controller 14. As schematically illustrated in FIG. 24, the address of the memory 31d that is indicated by the bitmap printing positions X and Y in the image 73 and corresponds to the address 73b in printing is calculated on the basis of the address of the head of the area of one page. On the basis of the calculated address, the print image data 73a is written in the memory 31d.

Figure 25A:
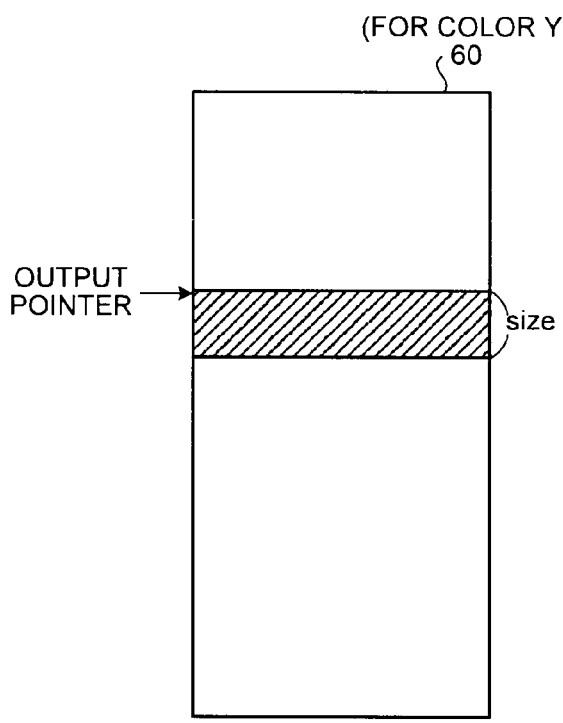
FIGS. 25A and 25B are schematic diagrams illustrating an example of a method of arranging print image data on a memory using a second method.
Figure 25B:
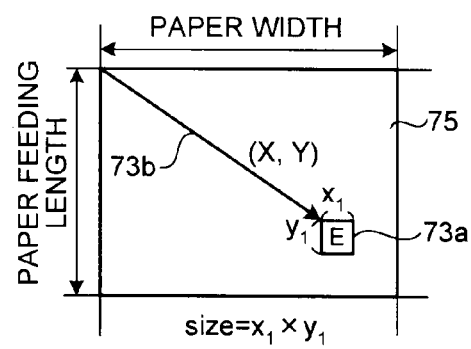

An example of a method of arranging the print image data of the images 70 to 73 on the memories 31a to 31d using the second method will be described using FIGS. 25A and 25B. In this case, the image 73 in FIGS. 22A to 22C described above is used. FIG. 25A illustrates an example of the virtual memory 60 for the color Y and FIG. 25B illustrates an example of an actual printing area 75 in the printing paper 201.

In the printer controller 14, with respect to the virtual memory 60 for the color Y, a data size ($=x_1 \times y_1$) calculated from the X direction effective size ($x_1$) and the Y direction effective size ($y_2$) in the transfer management table is regarded as a data size of one page, and the address movement amount at the time of updating the output pointer and the input pointer is set. In the memory 31d, the print image data 73a of the image 73 to be printed next is written from the output pointer (refer to FIG. 25B).

In this case, in order to simplify the description, it is assumed that only print image data of one page is written in the memory 31d. In FIG. 25A, only the output pointer is illustrated and the input pointer is not illustrated.

At the time of printing, the image output unit 50 reads the print image data 73a from the memory 31d, on the basis of the address indicated by the output pointer, and performs printing of the print image data 73a, on the basis of the printing address 73b indicated by the bitmap printing positions X and Y of the image 73. If the print image data corresponding to the data size is read, the output pointer is moved by the data size, and the output pointer is updated.

In the second embodiment, the method of managing the input pointer and the output pointer on the virtual memory 60, the process of when the data is received from the upper level device 10, the process of when the print image data transfer ends, and the process of when print process ends are the same as those of the first embodiment. Therefore, the redundant description will not be repeated.

In the first embodiment and the second embodiment described above, the colors that are used for printing are the process colors of the colors C, M, Y, and K. However, the present invention is not limited to this. For example, even when colors of red (R), green (G), and blue (B) or special colors such as a gold color, a silver color, and a white color are used for printing, the first embodiment and the second embodiment can be applied as they are. Further, the number of colors is not limited to four. Even when printing is performed using five or more colors, or three or less colors, the first embodiment and the second embodiment can be applied as they are.

According to the present invention, it is possible to facilitate the control of the buffer memory for storing the plurality of image data which are printed and controlled independently of each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing device comprising:
   a plurality of storage units into which image data is written;
   a control unit which has storage space information indicating a same storage space as a storage space of each of the plurality of storage units and manages address information to perform a writing and reading of image data with respect to the plurality of storage units on the basis of the storage space information, the address information including an address as a transmission origin address, and the transmission origin address for image data of each color among the image data is a same address;
   a plurality of data managing units which are provided correspondingly to the plurality of storage units and perform the writing and the reading of the image data with respect to the plurality of storage units on the basis of the address information; and
   a printing unit which prints the image data read from the plurality of storage units on a same page.

2. The printing device according to claim 1,
   wherein the plurality of storage units commonly have the storage space information.

3. The printing device according to claim 1,
   wherein each of the plurality of storage units has the storage space information.

4. The printing device according to claim 1,
   wherein the address information includes first address information and second address information, and the control unit manages the first address information that indicates a head address for the reading and the second address information that indicates a head address for the writing.

5. The printing device according to claim 4,
   wherein the control unit manages empty areas of the plurality of storage units, on the basis of a difference of the address indicated by the first address information and the address indicated by the second address information.

6. The printing device according to claim 4,
   wherein the control unit updates the second address information by moving the head address for the writing by a predetermined unit of the image data, in accordance with a completion of the writing of the predetermined unit of the image data for all of the plurality of storage units.

7. The printing device according to claim 4,
   wherein the control unit updates the first address information by moving the head address for the reading by a predetermined unit of the image data, in accordance with a completion of the reading of the predetermined unit of the image data from all of the plurality of the storage units.

8. The printing device according to claim 7,
wherein the control unit clears an area with zero, the area corresponding to the predetermined unit of the image data from the address indicated by the first address information immediately before the update thereof, at any time point from the completion of the reading of the predetermined unit of the image data from all of the plurality of storage units until the image data is written into the plurality of storage units.

9. The printing device according to claim 8,
wherein the control unit clears the area with zero, the area corresponding to the predetermined unit of the image data from the address indicated by the first address information immediately before the update thereof, upon updating the second address information.

10. A method of controlling a printing device, comprising:
by a control unit, managing address information to perform a writing and a reading of image data with respect to a plurality of storage units on the basis of storage space information indicating a same storage space as a storage space of each of the plurality of storage units into which the image data is written, the address information including an address as a transmission origin address, and the transmission origin address for image data of each color among the image data is a same address;
by a plurality of data managing units provided correspondingly to the plurality of storage units, performing the writing and the reading of the image data with respect to the plurality of storage units on the basis of the address information; and
by a printing unit, printing the image data read from each of the plurality of storage units on a same page.

* * * * *